(12) United States Patent
Mulliken et al.

(10) Patent No.: US 12,700,289 B2
(45) Date of Patent: Aug. 4, 2026

(54) SOUND-BASED ATTENTIVE STATE ASSESSMENT

(71) Applicant: APPLE INC., Cupertino, CA (US)

(72) Inventors: Grant H. Mulliken, Los Gatos, CA (US); Christine Godwin, Sunnyvale, CA (US); Izzet B. Yildiz, Sunnyvale, CA (US); Sterling R. Crispin, Santa Cruz, CA (US)

(73) Assignee: Apple Inc., Cupertino, CA (US)

( * ) Notice: Subject to any disclaimer, the term of this patent is extended or adjusted under 35 U.S.C. 154(b) by 682 days.

(21) Appl. No.: 18/071,867

(22) Filed: Nov. 30, 2022

(65) Prior Publication Data

US 2023/0282080 A1 Sep. 7, 2023

Related U.S. Application Data

(63) Continuation of application No. PCT/US2021/034179, filed on May 26, 2021.

(60) Provisional application No. 63/033,923, filed on Jun. 3, 2020.

(51) Int. Cl.
*G08B 3/00* (2006.01)
*G06F 3/01* (2006.01)

(52) U.S. Cl.
CPC .............. *G08B 3/00* (2013.01); *G06F 3/013* (2013.01); *G06F 3/015* (2013.01)

(58) Field of Classification Search
CPC ............ G08B 3/00; G06F 3/013; G06F 3/015
See application file for complete search history.

(56) References Cited

U.S. PATENT DOCUMENTS

| | | | |
|---|---|---|---|
| 5,137,027 A | 8/1992 | Rosenfeld | |
| 7,429,108 B2 | 9/2008 | Rosenberg | |
| 8,597,109 B2 * | 12/2013 | Herrmann | G07F 17/32 |
| | | | 463/16 |
| 8,979,545 B2 | 3/2015 | Duffy | |
| 9,596,508 B2 | 3/2017 | McCoy et al. | |

(Continued)

FOREIGN PATENT DOCUMENTS

| | | |
|---|---|---|
| CN | 105453070 A | 3/2016 |
| CN | 107427716 A | 12/2017 |

(Continued)

OTHER PUBLICATIONS

U.S. Patent and Trademark Office, Final Office Action issued Apr. 23, 2024, which pertains to U.S. Appl. No. 18/072,796 23 pgs.

(Continued)

*Primary Examiner* — Malina D. Blaise
(74) *Attorney, Agent, or Firm* — Thompson Hine LLP

(57) ABSTRACT

Various implementations disclosed herein include devices, systems, and methods that determine an attentive state of a user based on physiological data associated with a physiological response of the user to an auditory stimulus. For example, an example process may include selecting an auditory stimulus based on a characteristic of an environment, presenting the auditory stimulus to a user, obtaining, using a sensor, first physiological data associated with a physiological response of the user to the auditory stimulus, and assessing an attentive state of the user based on the physiological response of the user to the auditory stimulus.

21 Claims, 7 Drawing Sheets

(56) References Cited

U.S. PATENT DOCUMENTS

| | | | |
|---|---|---|---|
| 9,710,130 B2 | 7/2017 | Mulcahy et al. | |
| 10,231,614 B2 | 3/2019 | Krueger | |
| 10,303,245 B2 | 5/2019 | Ha et al. | |
| 10,572,005 B2 | 2/2020 | Zahn et al. | |
| 10,620,700 B2 | 4/2020 | Publicover et al. | |
| 10,835,823 B2* | 11/2020 | Sumant | G06V 40/174 |
| 10,902,243 B2* | 1/2021 | Wang | G06V 40/161 |
| 10,952,006 B1 | 3/2021 | Krol et al. | |
| 10,970,546 B2 | 4/2021 | Yakishyn et al. | |
| 11,039,742 B1* | 6/2021 | Abou Shousha | G06N 20/00 |
| 11,354,805 B2 | 6/2022 | Yildiz | |
| 11,861,837 B2 | 1/2024 | Yildiz | |
| 12,099,654 B1 | 9/2024 | Mulliken | |
| 2006/0203197 A1 | 9/2006 | Marshall | |
| 2009/0086165 A1 | 4/2009 | Beymer | |
| 2011/0262887 A1 | 10/2011 | Cleveland | |
| 2012/0083668 A1 | 4/2012 | Pradeep et al. | |
| 2014/0177906 A1 | 6/2014 | Horowitz | |
| 2014/0184550 A1 | 7/2014 | Hennessey et al. | |
| 2014/0243093 A1* | 8/2014 | Rom | A63F 13/212 |
| | | | 463/43 |
| 2015/0104771 A1 | 4/2015 | Bernstein | |
| 2015/0130703 A1 | 5/2015 | Ghajar | |
| 2015/0140528 A1 | 5/2015 | Sikström | |
| 2015/0213634 A1 | 7/2015 | Kamarkar et al. | |
| 2015/0297109 A1 | 10/2015 | Garten et al. | |
| 2015/0332166 A1 | 11/2015 | Ferens et al. | |
| 2016/0077547 A1 | 3/2016 | Aimone et al. | |
| 2016/0078369 A1 | 3/2016 | Frank et al. | |
| 2016/0080874 A1 | 3/2016 | Fullam | |
| 2016/0150575 A1* | 5/2016 | Andersen | H04W 84/18 |
| | | | 370/329 |
| 2016/0196758 A1 | 7/2016 | Causevic et al. | |
| 2016/0225012 A1 | 8/2016 | Ha et al. | |
| 2016/0262680 A1* | 9/2016 | Martucci | G09B 7/00 |
| 2016/0263345 A1 | 9/2016 | Shuster et al. | |
| 2016/0287157 A1* | 10/2016 | Simpson | A61B 5/6814 |
| 2016/0328015 A1 | 11/2016 | Ha et al. | |
| 2016/0372489 A1 | 12/2016 | Li | |
| 2017/0087470 A1* | 3/2017 | Bostick | A63F 13/35 |
| 2017/0131766 A1 | 5/2017 | He et al. | |
| 2017/0293356 A1 | 10/2017 | Khaderi et al. | |
| 2017/0352283 A1 | 12/2017 | Lau | |
| 2017/0357847 A1* | 12/2017 | Jabri | G06T 7/73 |
| 2017/0365101 A1 | 12/2017 | Samec et al. | |
| 2018/0139565 A1 | 5/2018 | Norris | |
| 2018/0184974 A1 | 7/2018 | Cimenser et al. | |
| 2018/0190309 A1 | 7/2018 | Glasgow | |
| 2018/0193589 A1* | 7/2018 | McLaughlin | A61M 21/02 |
| 2018/0255167 A1 | 9/2018 | Saito | |
| 2018/0285442 A1 | 10/2018 | Coleman et al. | |
| 2018/0301053 A1 | 10/2018 | Boccanfuso et al. | |
| 2018/0329727 A1 | 11/2018 | Cao et al. | |
| 2018/0345128 A1* | 12/2018 | Ahmed | A63F 13/537 |
| 2018/0365491 A1 | 12/2018 | Delaney | |
| 2018/0365875 A1 | 12/2018 | Yildiz | |
| 2019/0019089 A1 | 1/2019 | Baughman et al. | |
| 2019/0033914 A1 | 1/2019 | Aimone et al. | |
| 2019/0108191 A1 | 4/2019 | Frank | |
| 2019/0163258 A1 | 5/2019 | Baughman et al. | |
| 2019/0175090 A1 | 6/2019 | Reiner et al. | |
| 2019/0200920 A1 | 7/2019 | Tien | |
| 2019/0232500 A1 | 8/2019 | Bennett et al. | |
| 2019/0239790 A1 | 8/2019 | Gross et al. | |
| 2019/0250408 A1* | 8/2019 | Lafon | G02B 27/017 |
| 2019/0265802 A1 | 8/2019 | Parshionikar | |
| 2019/0350510 A1* | 11/2019 | Simpson | A61B 5/6803 |
| 2019/0355209 A1* | 11/2019 | Sorey | G07F 17/3206 |
| 2020/0061465 A1* | 2/2020 | Benedetto | A63F 13/55 |
| 2020/0089317 A1 | 3/2020 | Ghajar | |
| 2020/0089321 A1 | 3/2020 | Kacelenga | |
| 2020/0103244 A1* | 4/2020 | Cella | G06N 20/00 |
| 2020/0206631 A1* | 7/2020 | Sumant | A63F 13/55 |
| 2020/0296480 A1* | 9/2020 | Chappell, III | A61B 5/165 |
| 2020/0298131 A1* | 9/2020 | Pinto | A63F 13/79 |

| | | | |
|---|---|---|---|
| 2020/0349337 A1 | 11/2020 | Kameni | |
| 2021/0035298 A1 | 2/2021 | Yildiz | |
| 2021/0093967 A1* | 4/2021 | Hooks | A63F 13/213 |
| 2021/0192884 A1* | 6/2021 | Idris | G07F 17/323 |
| 2021/0272394 A1* | 9/2021 | Cella | G06Q 40/08 |
| 2021/0287459 A1* | 9/2021 | Cella | G07C 5/0808 |
| 2021/0298647 A1 | 9/2021 | Axo et al. | |
| 2021/0398539 A1 | 12/2021 | Wexler et al. | |
| 2022/0086592 A1 | 3/2022 | McElveen et al. | |
| 2022/0137915 A1* | 5/2022 | Verbeke | G10L 25/78 |
| | | | 704/235 |
| 2022/0261999 A1 | 8/2022 | Yildiz | |
| 2022/0312071 A1* | 9/2022 | Devaraj | H04N 21/44218 |
| 2022/0382506 A1 | 12/2022 | Hinckley et al. | |
| 2023/0080905 A1 | 3/2023 | Tomczek et al. | |
| 2023/0259203 A1 | 8/2023 | Mulliken | |
| 2023/0308505 A1 | 9/2023 | Sharma et al. | |
| 2023/0409278 A1* | 12/2023 | Miller | G06F 3/165 |
| 2024/0103617 A1 | 3/2024 | Yerkes et al. | |
| 2024/0164677 A1 | 5/2024 | Yildiz | |
| 2024/0211200 A1 | 6/2024 | Silfvast | |
| 2024/0335738 A1* | 10/2024 | Lake-Schaal | A63F 13/795 |
| 2025/0009270 A1* | 1/2025 | Simpson | A61B 5/6814 |
| 2025/0208704 A1 | 6/2025 | Mulliken | |

FOREIGN PATENT DOCUMENTS

| | | | |
|---|---|---|---|
| CN | 109620265 A | 4/2019 | |
| JP | 2018194931 A | 12/2018 | |
| RU | 2441585 C1 | 2/2012 | |
| WO | 2013/015730 A1 | 1/2013 | |
| WO | WO2015072202 | 5/2015 | |
| WO | WO2018100875 A1 | 6/2018 | |
| WO | WO2019067731 A1 | 4/2019 | |
| WO | WO2020159784 | 8/2020 | |
| WO | WO2020227254 | 11/2020 | |
| WO | WO2021150971 | 7/2021 | |
| WO | 2021247310 A1 | 12/2021 | |
| WO | 2021247312 A1 | 12/2021 | |
| WO | 2022212070 A1 | 10/2022 | |

OTHER PUBLICATIONS

European Patent Office, Communication pursuant to Article 94(3) EPC issued May 2, 2024, which pertains to European Patent Application No. 21733636.1 6 pgs.

China National Intellectual Property Administration, Notification of First Office Action (with English translation), Chinese Patent Application No. 202180057588.2, 19 pages, May 15, 2025.

Black, Rosemary, "Virtual Reality Programs Now Target Pain, Stress and Depression"; Published Jun. 24, 2020; pp. 1-6. 2020.

Black, Rosemary, "Learn to Practice CBT and ACT at Home"; Published Oct. 21, 2019; pp. 1-4. 2019.

Bixler, Robert et al., "Automatic gaze-based user-independent detection of mind wandering during computerized reading," User Modeling and User-Adapted Interaction, Dordrecht, NL, vol. 26, No. 1, pp. 33-68, Sep. 2015.

Parsons, T.D. and Reinebold, J.L., "Adaptive Virtual Environments for Neuropsychological Assessment in Serious Games," IEEE Transactions on Consumer Electronics, vol. 58, No. 2, May 2012.

European Patent Office, Extended European Search Report issued Feb. 2, 2024, which pertains to European Patent Application No. 24152395.0. 10 pgs.

European Patent Office (ISA/EP), International Search Report and Written Opinion of the International Searching Authority, International Application No. PCT/US2021/034179, 16 pages, Sep. 10, 2021.

Bombeke, K. et al., "Do Not Disturb: Psychophysiological Correlates of Boredom, Flow and Frustration During VR Gaming," International Conference on Image Analysis and Processing (ICIAP), 17th International Conference, Naples, Italy, 19 pages, Sep. 2013.

Kuziek, J. et al., "Real brains in virtual worlds: Validating a novel oddball paradigm in virtual reality," bioRxiv, 45 pages, https://www.biorxiv.org/content/10.1101/749192v3.full.pdf, Mar. 2020.

(56)        References Cited

OTHER PUBLICATIONS

Rizzo, A. et al., "Virtual Reality and Cognitive Assessment and Rehabilitation: The State of the Art," *Virtual Reality in Neuro-Psycho-Physiology*, Giuseppe Riva (Ed.), 26 pages, 1997.
European Patent Office, Communication pursuant to Article 94(3) EPC issued in European Patent Application No. 24152395.0 dated Feb. 16, 2026 (Eight (8) pages).
China National Intellectual Property Administration, Second Office Action issued in CN Patent Application No. 202180057588.2 dated Sep. 29, 2025 with English translation (14 pages).
European Patent Office, Communication pursuant to Article 94(3) EPC issued in EP Application No. 24152395.0 dated Jul. 28, 2025 (Eight (8) pages).
European Patent Office, Communication pursuant to Article 94(3) EPC issued in EP Application No. 24152395.0 dated Aug. 9, 2025 (Five (5) pages).
European Patent Office, Communication under Rule 71(3) EPC issued in EP Application No. 21740280.9 dated Sep. 27, 2023 (Nine (9) pages).
China National Intellectual Property Administration, Rejection Decision issued in Chinese Patent Application No. 202180057588.2 dated Mar. 3, 2026 with English translation (13 pages).

* cited by examiner

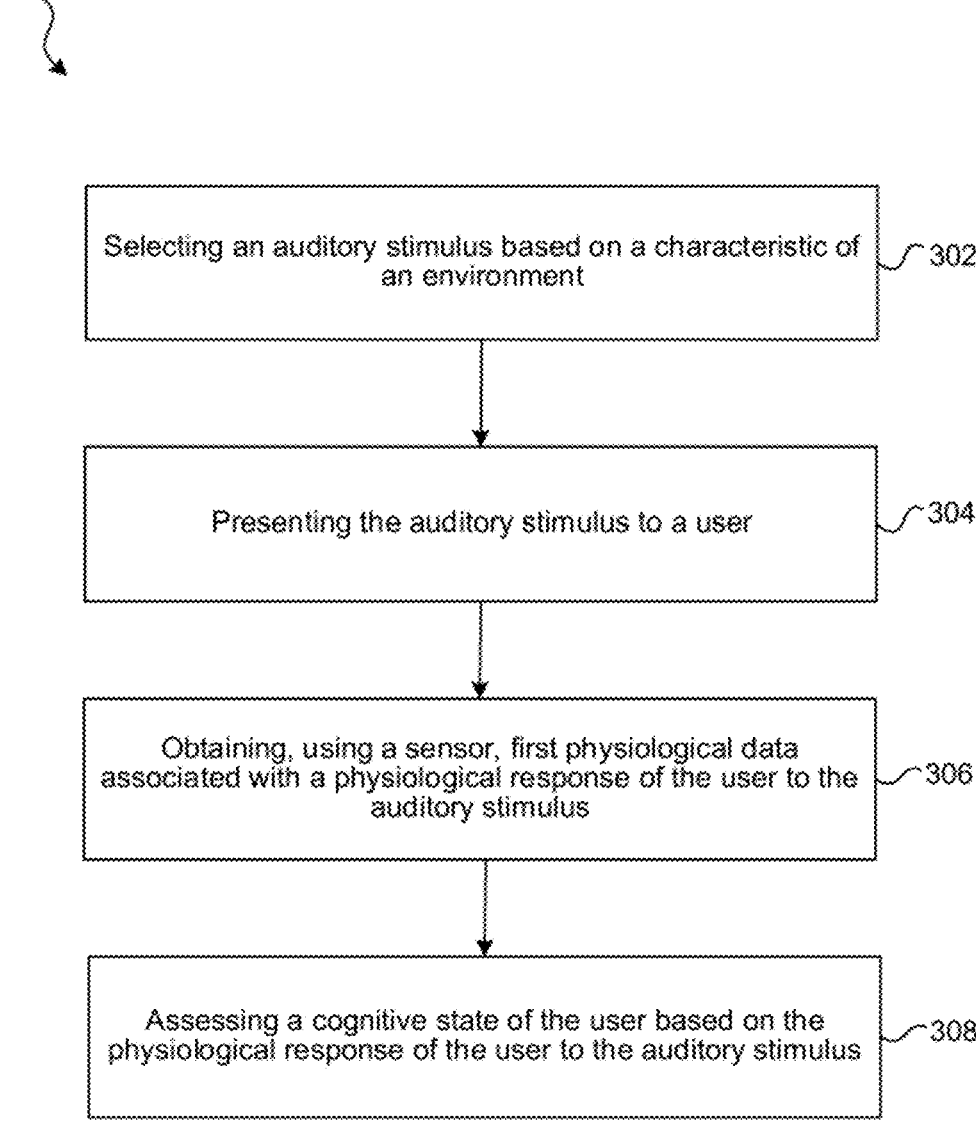

300

Selecting an auditory stimulus based on a characteristic of an environment    302

Presenting the auditory stimulus to a user    304

Obtaining, using a sensor, first physiological data associated with a physiological response of the user to the auditory stimulus    306

Assessing a cognitive state of the user based on the physiological response of the user to the auditory stimulus    308

FIG. 3

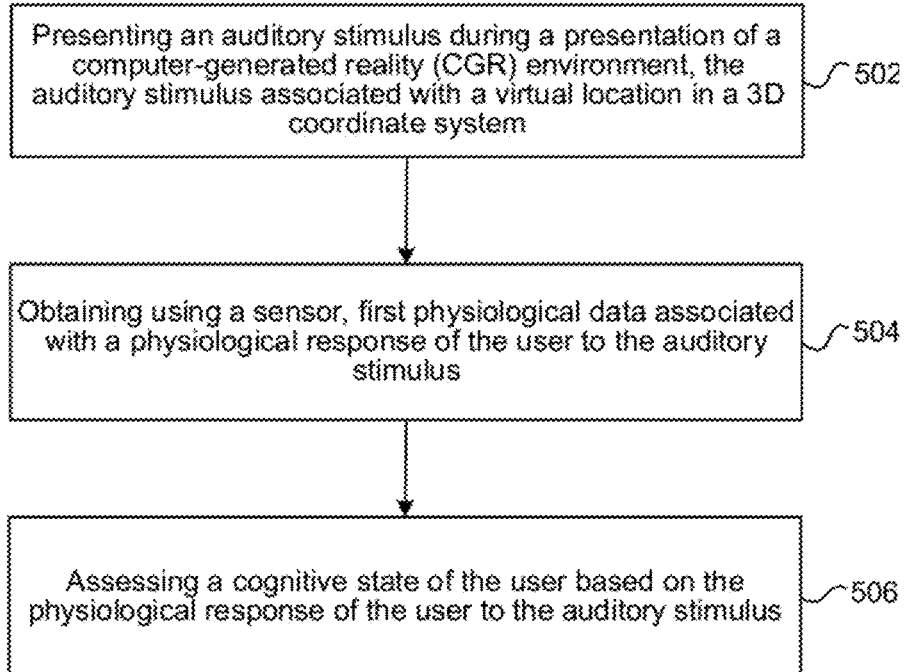

500

Presenting an auditory stimulus during a presentation of a computer-generated reality (CGR) environment, the auditory stimulus associated with a virtual location in a 3D coordinate system ⌐ 502

Obtaining using a sensor, first physiological data associated with a physiological response of the user to the auditory stimulus ⌐ 504

Assessing a cognitive state of the user based on the physiological response of the user to the auditory stimulus ⌐ 506

FIG. 5

SOUND-BASED ATTENTIVE STATE ASSESSMENT

CROSS-REFERENCE TO RELATED APPLICATIONS

This patent application is a continuation of International Application No. PCT/US2021/034179 filed May 26, 2021, entitled "SOUND-BASED ATTENTIVE STATE ASSESS-MENT," which claims the benefit of U.S. Provisional Application No. 63/033,923 filed Jun. 3, 2020, entitled "SOUND-BASED COGNITIVE STATE ASSESSMENT," each of which is incorporated herein by reference in its entirety.

TECHNICAL FIELD

The present disclosure generally relates to presenting content via electronic devices, and in particular, to systems, methods, and devices that determine a user's attentive state during and/or based on the presentation of visual or auditory content.

BACKGROUND

A user's attentive state while viewing and listening to content on an electronic device can have a significant effect on the user's experience. For example, staying focused and engaged may be required for meaningful experiences, such as meditation, learning a new skill, watching educational or entertaining content, or reading a document. Improved techniques for assessing the attentive states of users viewing and interacting with content may enhance a user's enjoyment, comprehension, and learning of the content. Moreover, content may not be presented in a way that makes sense to a particular user. Content creators and systems may be able to provide better and more tailored user experiences that a user is more likely to enjoy, comprehend, and learn from based on attentive state information.

SUMMARY

Various implementations disclosed herein include devices, systems, and methods that assess an attentive state of a user based on a physiological response to an auditory stimulus. The auditory stimulus may be selected to both evoke responses that are useful in assessing attentive state and to have additional suitable attributes. Stimuli may be selected, for example, to blend in with the natural scene and surroundings of a user's current environment. The auditory characteristics, spatial location, and timing of the stimuli may be selected. For example, a particular auditory stimulus (e.g., a bird chirp) may be selected for use in a natural soundscape used a during meditation based on that bird chirp sound being both a suitable sound for evoking responses useful in assessing attentive state and a sound expected in or otherwise consistent with the natural sound-scape environment. Moreover attributes of the auditory stimulus may also be selected, such as the volume, spatial positioning, and timing of the stimuli. Some implementations improve attentive state assessment accuracy, e.g., improving the assessment of a users attention to a task (e.g., focusing on breathing techniques during a meditation experience). Some implementations improve user experiences by providing cognitive assessments that minimize or avoid interrupting or disturbing user experiences, for example, without significantly interrupting a users attention or ability to perform a task.

In some implementations, the auditory stimulus may be selected based on a characteristic of an environment of the user (e.g., real-world physical environment, a virtual environment, or a combination of each). The device (e.g., a handheld, laptop, desktop, or head-mounted device (HMD)) provides an experience (e.g., a visual and/or auditory experience) of the real-world physical environment, an extended reality (XR) environment, or a combination of each (e.g., mixed reality environment) to the user. The device obtains, with a sensor, physiological data (e.g., electroencephalography (EEG) amplitude, pupil modulation, eye gaze saccades, etc.) associated with a response of the user to the auditory stimulus. Based on the obtained physiological data, the techniques described herein can determine a user's attentive state (e.g., attentive, mind-wandering, etc.) during the experience (e.g., a meditation experience). Based on the physiological data and associated physiological response, the techniques can provide feedback to the user that the current attentive state differs from an intended attentive state of the experience, recommend similar content or similar portions of the experience, and/or adjust content or feedback mechanisms corresponding to the experience.

In an exemplary implementation, the integration of meditation and mindfulness practices with techniques described herein can enhance a meditation experience by providing individuals with real-time feedback on meditation performance. Staying focused and engaged during meditation can improve the user's meditation practice and help a user gain the benefits associated with meditation. For example, novices who are interested in meditating may have trouble staying on task during a meditation session, and they may benefit from accurate feedback on their performance. The techniques described herein can present a naturalized sound consistent a user's environment to detect when the user gets distracted while meditating based on the user's physiological response (or lack of response) to the auditory stimulus. Finding defined markers of attention lapses and providing performance feedback during meditation could enhance a user experience, provide additional benefits from the meditation session, and provide a guided and supportive teaching approach (e.g., via a scaffolding teaching method) for users to advance through their meditation practice.

Physiological response data, such as EEG amplitude/frequency, pupil modulation, eye gaze saccades, etc., can depend on the attention state of an individual and characteristics of the scene in front of him or her and the auditory stimulus that is presented therein. Physiological response data can be obtained while using a device with eye tracking technology while users perform mindfulness tasks that demand varying levels of attention, such as focused attention to breath meditation. In some implementations, physiological response data can be obtained using other sensors, such as EEG sensors. Observing repeated measures of physiological response data to an auditory stimulus can give insights about the underlying attention state of the user at different time scales. These metrics of attention can be used to provide feedback during a meditation experience.

Experiences other than meditation experiences can utilize the techniques described herein regarding assessing attentive states. For example, an education experience could notify a student to stay on track when he or she appears to be mind wandering. Another example may be a workplace experience of notifying a worker who needs to be focused on his or her current task. For example, providing feedback to a surgeon who may be getting a little tired during a long surgery, alerting a truck driver on a long drive he or she is losing focus and may need to pull over to sleep, and the like.

The techniques described herein can be customized to any user and experience that may need some type of feedback mechanism to enter or maintain one or more particular attentive states.

In general, one innovative aspect of the subject matter described in this specification can be embodied in methods that include the actions of selecting an auditory stimulus based on a characteristic of an environment, presenting the auditory stimulus to a user, obtaining, using a sensor, first physiological data associated with a physiological response of the user to the auditory stimulus, and assessing an attentive state of the user based on the physiological response of the user to the auditory stimulus.

These and other embodiments can each optionally include one or more of the following features.

In some implementations, selecting the auditory stimulus includes classifying the environment into an environment type, and selecting the auditory stimulus based on the environment type.

In some implementations, selecting the auditory stimulus includes classifying one or more objects in the environment, and selecting the auditory stimulus based on the classified one or more objects.

In some implementations, selecting the auditory stimulus includes determining, from an auditory stimuli database, one or more auditory stimuli that evoke a response for assessing attention of a user, and selecting the auditory stimulus from the one or more auditory stimuli based on the environment.

In some implementations, the auditory stimulus is a discrete sound, a series of sounds, or a spatialized sound.

In some implementations, the environment is a physical environment around the user. In some implementations, the environment is an extended reality (XR) experience that is presented to the user.

In some implementations, obtaining the first physiological data associated with a physiological response of the user to the auditory stimulus includes monitoring for a response or lack of response occurring within a predetermined time following the presenting of the auditory stimulus. In some implementations, the first physiological data includes electroencephalogram (EEG) amplitude data that is associated with the user.

In some implementations, the first physiological data includes pupillary movement that is associated with the user. In some implementations, the attentive state is assessed using a statistical or machine learning-based classification technique. In some implementations, the method further includes providing a notification to the user based on the attentive state.

In some implementations, the method further includes identifying a portion of the content associated with the attentive state.

In some implementations, the method further includes customizing the content based on the attentive state of the user.

In some implementations, the method further includes aggregating attentive states determined for multiple users viewing the content to provide feedback regarding the content.

In some implementations, the device is a head-mounted device (HMD) and the environment includes an extended reality (XR) environment.

In accordance with some implementations, a non-transitory computer readable storage medium has stored therein instructions that are computer-executable to perform or cause performance of any of the methods described herein. In accordance with some implementations, a device includes one or more processors, a non-transitory memory, and one or more programs; the one or more programs are stored in the non-transitory memory and configured to be executed by the one or more processors and the one or more programs include instructions for performing or causing performance of any of the methods described herein.

BRIEF DESCRIPTION OF THE DRAWINGS

So that the present disclosure can be understood by those of ordinary skill in the art, a more detailed description may be had by reference to aspects of some illustrative implementations, some of which are shown in the accompanying drawings.

FIG. 3 is a flowchart representation of a method for assessing an attentive state of a user based on a physiological response to an auditory stimulus selected based on a characteristic of an environment.

FIG. 5 is a flowchart representation of a method for assessing an attentive state of the user based on a physiological response to an auditory stimulus associated with a virtual location in a three-dimensional (3D) coordinate system.

Figure 2:
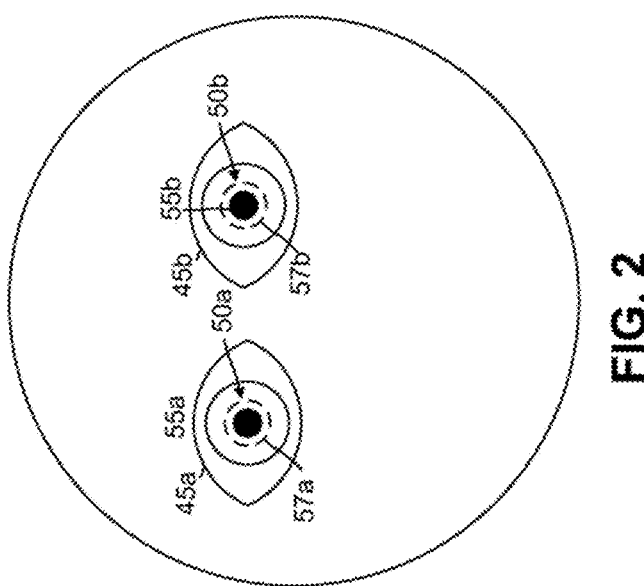
FIG. 2 illustrates a pupil of the user of FIG. 1 in which the diameter of the pupil varies with time in accordance with some implementations.

In accordance with common practice the various features illustrated in the drawings may not be drawn to scale. Accordingly, the dimensions of the various features may be arbitrarily expanded or reduced for clarity. In addition, some of the drawings may not depict all of the components of a given system, method or device. Finally, like reference numerals may be used to denote like features throughout the specification and figures.

DESCRIPTION

Numerous details are described in order to provide a thorough understanding of the example implementations shown in the drawings. However, the drawings merely show some example aspects of the present disclosure and are therefore not to be considered limiting. Those of ordinary skill in the art will appreciate that other effective aspects or variants do not include all of the specific details described herein. Moreover, well-known systems, methods, components, devices and circuits have not been described in exhaustive detail so as not to obscure more pertinent aspects of the example implementations described herein.

Figure 1:
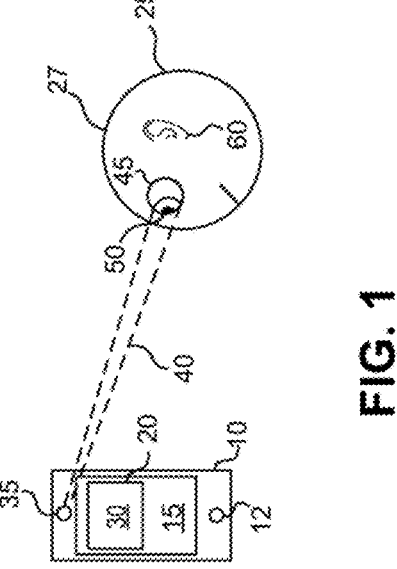
FIG. 1 illustrates a device displaying a visual experience and obtaining physiological data from a user according to some implementations.

FIG. 1 illustrates a real-world environment 5 including a device 10 with a display 15. In some implementations, the device 10 displays content 20 to a user 25, and a visual characteristic 30 that is associated with content 20. For example, content 20 may be a button, a user interface icon, a text box, a graphic, etc. In some implementations, the visual characteristic 30 associated with content 20 includes visual characteristics such as hue, saturation, size, shape, spatial frequency, motion, highlighting, etc. For example, content 20 may be displayed with a visual characteristic 30 of green highlighting covering or surrounding content 20.

In some implementations, content 20 may be a visual experience (e.g., a meditation experience), and the visual characteristic 30 of the visual experience may continuously change during the visual experience. As used herein, the phrase "experience" refers to a period of time during which a user uses an electronic device and has one or more attentive states. In one example, a user has an experience in which the user perceives a real-world environment while holding, wearing, or being proximate to an electronic device that includes one or more sensors that obtain physiological data to assess an eye characteristic that is indicative of the user's attentional state. In another example, a user has an experience in which the user perceives content displayed by an electronic device while the same or another electronic obtains physiological data (e.g., pupil data, EEG data, etc.) to assess the user's attentive state. In another example, a user has an experience in which the user holds, wears, or is proximate to an electronic device that provides a series of audible or visual instructions that guide the experience. For example, the instructions may instruct the user to have particular attentive states during particular time segments of the experience, e.g., instructing the user to focus on his or her breath for the first 30 seconds, to stop focusing on his her breath for the next 30 seconds, to refocus on his or her breath for the next 45 seconds, etc. During such an experience, the same or another electronic device may obtain physiological data to assess the user's attentive state.

In some implementations, the visual characteristic 30 is a feedback mechanism for the user that is specific to the experience (e.g., a visual or audio cue to focus on a particular task during an experience, such as breathing during a meditation experience). In some implementations, the visual experience (e.g., content 20) can occupy the entire display area of display 15. For example, during a meditation experience, content 20 may be a meditation video or sequence of images that may include visual and/or audio cues as the visual characteristic 30 presented to the user to focus on breathing. Other visual experiences that can be displayed for content 20 and visual and/or audio cues for the visual characteristic 30 will be further discussed herein.

The device 10 obtains physiological data (e.g., EEG amplitude/frequency, pupil modulation, eye gaze saccades, etc.) from the user 25 via a sensor 35. For example, the device 10 obtains pupillary data 40 (e.g., eye gaze characteristic data). While this example and other examples discussed herein illustrate a single device 10 in a real-world environment 5, the techniques disclosed herein are applicable to multiple devices and multiple sensors, as well as to other real-world environments/experiences. For example, the functions of device 10 may be performed by multiple devices.

In some implementations, as illustrated in FIG. 1, the device 10 is a handheld electronic device (e.g., a smartphone or a tablet). In some implementations the device 10 is a laptop computer or a desktop computer. In some implementations, the device 10 has a touchpad and, in some implementations, the device 10 has a touch-sensitive display (also known as a "touch screen" or "touch screen display"). In some implementations, the device 10 is a wearable head mounted display (HMD).

In some implementations, the device 10 includes an eye tracking system for detecting eye position and eye movements. For example, an eye tracking system may include one or more infrared (IR) light-emitting diodes (LEDs), an eye tracking camera (e.g., near-IR (NIR) camera), and an illumination source (e.g., an NIR light source) that emits light (e.g., NIR light) towards the eyes of the user 25. Moreover, the illumination source of the device 10 may emit NIR light to illuminate the eyes of the user 25 and the NIR camera may capture images of the eyes of the user 25. In some implementations, images captured by the eye tracking system may be analyzed to detect position and movements of the eyes of the user 25, or to detect other information about the eyes such as pupil dilation or pupil diameter. Moreover, the point of gaze estimated from the eye tracking images may enable gaze-based interaction with content shown on the near-eye display of the device 10.

In some implementations, the device 10 has a graphical user interface (GUI), one or more processors, memory and one or more modules, programs or sets of instructions stored in the memory for performing multiple functions. In some implementations, the user 25 interacts with the GUI through finger contacts and gestures on the touch-sensitive surface. In some implementations, the functions include image editing, drawing, presenting, word processing, website creating, disk authoring, spreadsheet making, game playing, telephoning, video conferencing, e-mailing, instant messaging, workout support, digital photographing, digital videoing, web browsing, digital music playing, and/or digital video playing. Executable instructions for performing these functions may be included in a computer readable storage medium or other computer program product configured for execution by one or more processors.

In some implementations, the device 10 employs various physiological sensor, detection, or measurement systems. Detected physiological data may include, but is not limited to, EEG, electrocardiography (ECG), electromyography (EMG), functional near infrared spectroscopy signal (fNIRS), blood pressure, skin conductance, or pupillary response. Moreover, the device 10 may simultaneously detect multiple forms of physiological data in order to benefit from synchronous acquisition of physiological data. Moreover, in some implementations, the physiological data represents involuntary data, e.g., responses that are not under conscious control. For example, a pupillary response may represent an involuntary movement.

In some implementations, one or both eyes 45 of the user 25, including one or both pupils 50 of the user 25 present physiological data in the form of a pupillary response (e.g., pupillary data 40). The pupillary response of the user 25 results in a varying of the size or diameter of the pupil 50, via the optic and oculomotor cranial nerve. For example, the pupillary response may include a constriction response (miosis), e.g., a narrowing of the pupil, or a dilation response (mydriasis), e.g., a widening of the pupil. In some implementations, the device 10 may detect patterns of physiological data representing a time-varying pupil diameter.

In some implementations, a pupillary response may be in response to an auditory stimulus that one or both ears 60 of the user 25 detect. For example, device 10 may include a speaker 12 that projects sound via sound waves 14. The device 10 may include other audio sources such as a headphone jack for headphones, a wireless connection to an external speaker, and the like.

FIG. 2 illustrates pupils 50*a-b* of the user 25 of FIG. 1 in which the diameter of the pupils 50*a-b* varies with time. Pupil diameter tracking may be potentially indicative of a physiological state of a user. As shown in FIG. 2, a present physiological state (e.g., present pupil diameter 55*a-b*) may vary in contrast to a past physiological state (e.g., past pupil diameter 57*a-b*). For example, the present physiological state may include a present pupil diameter and a past physiological state may include a past pupil diameter.

The physiological data may vary in time and the device 10 may use the physiological data to measure one or both of a user's physiological response to the visual characteristic 30 or the users intention to interact with content 20. For example, when presented with content 20, such as a list of content experiences (e.g., meditation environments), by a device 10, the user 25 may select an experience without requiring the user 25 to complete a physical button press. In some implementations, the physiological data includes the physiological response of an auditory stimulus of a radius of the pupil 50 after the user 25 glances at content 20, measured via eye-tracking technology (e.g., via a HMD). In some implementations, the physiological data includes the physiological response of an auditory stimulus of EEG amplitude/frequency data measured via EEG technology, or EMG data measured from EMG sensors or motion sensors.

Returning to FIG. 1, according to some implementations, the device 10 may generate and present an extended reality (XR) environment to their respective users. An extended reality (XR) environment refers to a wholly or partially simulated environment that someone may interact with and/or sense using an electronic device. For example, an XR environment may include virtual reality (VR) content, augmented reality (AR) content, mixed reality (MR) content, or the like. Using an XR system, a portion of a person's physical motions, or representations thereof, may be tracked. In response, one or more characteristics of a virtual object simulated in the XR environment may be adjusted such that it adheres to one or more laws of physics. For example, the XR system may detect a user's movement and, in response, adjust graphical and auditory content presented to the user in a way similar to how views and sounds would change in a physical environment. In another example, the XR system may detect movement of an electronic device presenting an XR environment (e.g., a laptop, a mobile phone, a tablet, or the like) and, in response, adjust graphical and auditory content presented to the user in a way similar to how views and sounds would change in a physical environment. In some situations, the XR system may adjust one or more characteristics of graphical content in the XR environment responsive to a representation of a physical motion (e.g., a vocal command).

Various electronic systems enable one to interact with and/or sense XR environments. For example, projection-based systems, head-mountable systems, heads-up displays (HUDs), windows having integrated displays, vehicle windshields having integrated displays, displays designed to be placed on a user's eyes (e.g., similar to contact lenses), speaker arrays, headphones/earphones, input systems (e.g., wearable or handheld controllers with or without haptic feedback), tablets, smartphones, and desktop/laptop computers may be used. A head-mountable system may include an integrated opaque display and one or more speakers. In other examples, a head-mountable system may accept an external device having an opaque display (e.g., a smartphone). The head-mountable system may include one or more image sensors and/or one or more microphones to capture images or video and/or audio of the physical environment. In other examples, a head-mountable system may include a transparent or translucent display. A medium through which light representative of images is directed may be included within the transparent or translucent display. The display may utilize OLEDs, LEDs, uLEDs, digital light projection, laser scanning light source, liquid crystal on silicon, or any combination of these technologies. The medium may be a hologram medium, an optical combiner, an optical waveguide, an optical reflector, or a combination thereof. In some examples, the transparent or translucent display may be configured to selectively become opaque. Projection-based systems may use retinal projection technology to project graphical images onto a user's retina. Projection systems may also be configured to project virtual objects into the physical environment, for example, on a physical surface or as a hologram.

FIG. 3 is a flowchart illustrating an exemplary method 300. In some implementations, a device such as device 10 (FIG. 1) performs the techniques of method 300 to assess an attentive state of a user based on a physiological response to an auditory stimulus selected based on a characteristic of an environment (e.g., visual and/or auditory electronic content that could be of the real-world physical environment, virtual content, or a combination of each). In some implementations, the techniques of method 300 are performed on a mobile device, desktop, laptop, HMD, or server device. In some implementations, the method 300 is performed on processing logic, including hardware, firmware, software, or a combination thereof. In some implementations, the method 300 is performed on a processor executing code stored in a non-transitory computer-readable medium (e.g., a memory).

At block 302, the method 300 selects an auditory stimulus (e.g., a sound) based on a characteristic of an environment. For example, selecting a bird chirping sound as the auditory stimulus based on determining that the user is viewing a wooded environment in which the bird chirping sound could naturally occur. In some implementations, the environment is a real-world environment that is presented to the user. For example, the experience may include a real time video of a physical environment (e.g., a live scenic view of nature for meditation) or a live view through an HMD (e.g., the user is located at a real-world scenic view of nature for meditation, such as a quiet park). In some implementations, the environment is a XR environment being presented to the user. Alternatively, the environment could be a mixed reality (MR) experience that is presented to the user where virtual reality images maybe overlaid onto the live view (e.g., augmented reality (AR)) of the physical environment.

In some implementations, determining a characteristic of an environment may be based on classifying the environment into an environment type (e.g., forest, park, school, beach, crowded event, etc.) and selecting a corresponding sound as the auditory stimulus. Additionally, or alternatively, determining a characteristic of an environment may be based on classifying one or more particular objects (e.g., tree, bird, wave, etc.) in the environment, and selecting a corresponding sound as the auditory stimulus based on the classified one or more objects.

In some implementations, the system may compile a library of sounds determined to evoke appropriate user responses for assessing attention and selection one of those sounds based on a user's environment. For example, the method 300 may further include determining, from an auditory stimuli database, one or more auditory stimuli that evoke a response for assessing attention of a user, and selecting the auditory stimulus from the one or more auditory stimuli based on the environment.

At block 304, the method 300 presents the auditory stimulus to a user. For example, the auditory stimulus could be a discrete sound (e.g., a bird chirp) or a series of sounds (e.g., beep, beep, beep, BEEP). In some implementations, the auditory stimulus is a spatialized sound. The auditory stimulus may be naturalistic event-related sensory stimuli that is largely unnoticeable in the sense that the stimuli may blend in with a users natural scene and surroundings. In particular, a spatial location and timing of such stimuli can be controlled so that their statistics match the particular sensory environment a user may be experiencing. For example, a natural soundscape might be used during meditation in which bird sounds are distributed in space and time, but are able to produce sensory evoked neural responses while not appearing annoying or unnaturally salient. Furthermore, using spatial audio, these particular events (e.g., an auditory stimulus) can be varied spatially (e.g., along the azimuth) to evoke lateralized brain responses (e.g., EEG/EMP amplitude data).

At block 306, the method 300 obtains, using a sensor, first physiological data (e.g., EEG amplitude/frequency, pupil modulation, eye gaze saccades, etc.) associated with a physiological response (or lack of response) of the user to the auditory stimulus. For example, obtaining the physiological data may involve monitoring for a response or lack of response occurring within a predetermined time following the presenting of the auditory stimulus.

In some implementations, obtaining the first physiological data associated with a physiological response of the user to the auditory stimulus includes monitoring for a response or lack of response occurring within a predetermined time following the presenting of the auditory stimulus. For example, the system may wait for up to five seconds to see if a spatialized bird chirp off in the horizon causes the user to look in that direction (e.g., a physiological response).

In some implementations, obtaining physiological data (e.g., pupillary data 40) is associated with a gaze of a user that may involve obtaining images of the eye or electrooculography signal (EOG) data from which gaze direction and/or movement can be determined.

At block 308, the method 300 assesses an attentive state of the user based on the physiological response of the user to the auditory stimulus. For example, the response may be compared with the user's own prior responses or typical user responses to a similar auditory stimulus. In some implementations, attentive state may be determined using statistical or machine learning-based classification techniques. The determined attentive state could be used to provide feedback to the user, reorient the user, provide statistics to the user, and/or help content creators improve the content of the experience.

In some implementations, one or more pupillary or EEG characteristics may be determined, aggregated, and used to classify the user's attentive state using statistical or machine learning techniques. For example, the physiological data may be classified based on comparing the variability of the physiological data to a threshold. For example, if the baseline for a user's EEG data is determined during an initial segment of time (e.g., 30-60 seconds), and during a subsequent segment of time following the auditory stimulus (e.g., 5 seconds) the EEG data deviates more than +/−10% from the EEG baseline during the subsequent segment of time, than the techniques described herein could classify the user as transitioned away from the first attentive state (e.g., meditation) and entered a second attentive state (e.g., mind wandering).

In some implementations, the physiological responses can be compared based on the statistical frequency of the sounds. For example, several naturalistic sounds may be presented to a user, some of the naturalistic sounds are common (e.g., occur 80% of the time) and some of the naturalistic sounds are less common (e.g., occur 20% of the time). In some implementations, the physiological responses to the less common sounds may be amplified because of their novelty relative to the more common sounds, and the physiological responses to the less common sounds may be measured at about 300-800 ms after being presented to the user.

In some implementations, a machine learning model may be used to classify the user's attentive state. For example, labeled training data for a user may be provided to the machine learning model. In some implementations, the machine learning model is a neural network (e.g., an artificial neural network), decision tree, support vector machine, Bayesian network, or the like. These labels may be collected from the user beforehand, or from a population of people beforehand, and fine-tuned later on individual users. Creating this labeled data may require many users going through an experience (e.g., meditation experience) where the users listen to natural sounds with intermixed natural-probes (e.g., auditory stimulus) and then randomly are asked how focused or relaxed they were shortly after a probe was presented. The answers to these questions can generate a label for the time prior to the question and a deep neural network or deep long short term memory (LSTM) network might learn a combination of features specific to that user or task given those labels.

In some implementations, use cases for assessing attentive states based on the physiological response of the user to an auditory stimulus may include meditation experiences, educational experiences, occupational experiences, and the like.

In some implementations, feedback can be provided to a user based on determining that the first attentive state (e.g., mind wandering) differs from an intended attentive state (e.g., focused attention) of the experience. In some implementations, the method 300 may further include presenting feedback (e.g., audio feedback such as "control your breathing", visual feedback, etc.) during the experience in response to determining that the first attentive state differs from a second attentive state intended for the experience. In one example, during a portion of a meditation experience in which a user is directed to focus on his or her breath, the method determines to present feedback reminding the user to focus on breathing based on detecting that the user is instead in a mind wandering attentive state.

In some implementations, content recommendation for a content developer can be provided based on determining attentive states during the presented experience and changes of the experience or content presented therein. For example, the user may focus well when particular types of content are provided. In some implementations, the method 300 may further include identifying content based on similarity of the content to the experience, and providing a recommendation of the content to the user based on determining that the user has the first attentive state during the experience (e.g., mind wandering).

In some implementations, content for the experience can be adjusted corresponding to the experience based on the attentive state differing from an intended attentive state for the experience. For example, content may be adjusted by an experience developer to improve recorded content for a subsequent use for the user or other users. In some implementations, the method 300 may further include adjusting content corresponding to the experience in response to determining that the first attentive state differs from a second attentive state intended for the experience.

In some implementations, the techniques described herein obtain physiological data (e.g., pupillary data 40, EEG amplitude/frequency data, pupil modulation, eye gaze saccades, etc.) from the user based on identifying typical interactions of the user with the experience. For example, the techniques may determine that a variability of an eye gaze characteristic of the user correlates with an interaction with the experience including the auditory stimulus presented within the experience. Additionally, the techniques described herein may then adjust a visual characteristic of the experience, or adjust/change the sound associated with the auditory stimulus, to enhance physiological response data associated with future interactions with the experience and/or the auditory stimulus presented within the experience. Moreover, in some implementations, changing an auditory stimulus after the user interacts with the auditory stimulus within the experience informs the physiological response of the user in subsequent interactions with the experience or a particular segment of the experience. For example, the user may present an anticipatory physiological response associated with the change in an auditory stimulus prior to the auditory stimulus being changed within the experience. Thus, in some implementations, the technique identifies an intent of the user to interact with the auditory stimulus based on an anticipatory physiological response. For example, the technique may adapt or train an instruction set by capturing or storing physiological data of the user based on the interaction of the user with the experience and the auditory stimuli, including the user's response to an enhanced/updated auditory stimulus, and may detect a future intention of the user to interact with the experience and the auditory stimuli by identifying a physiological response of the user in anticipation of the presentation of the enhanced/updated and the auditory stimuli.

In some implementations, an estimator or statistical learning method is used to better understand or make predictions about the physiological data (e.g., pupillary data characteristics, EEG data, etc.). For example, statistics for EEG data may be estimated by sampling a dataset with replacement data (e.g., a bootstrap method).

Figure 4:
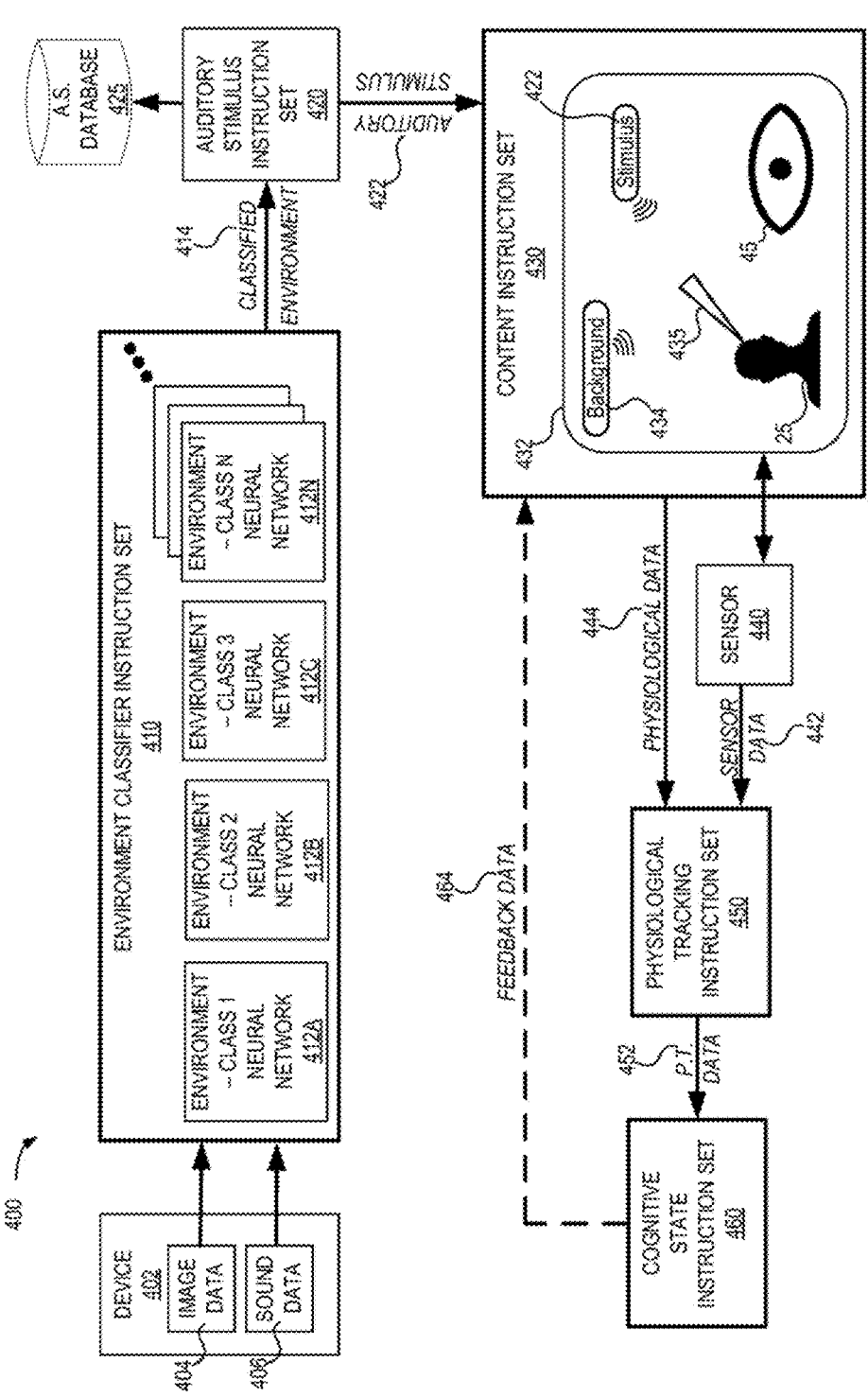
FIG. 4 illustrates selecting an auditory stimulus based on a characteristic of an environment and assessing an attentive state of a user based on a physiological response to the auditory stimulus.

FIG. 4 is a system flow diagram of an example environment 400 in which an attentive state assessment system can select an auditory stimulus based on a characteristic of an environment and assess an attentive state of a user based on a physiological response to the auditory stimulus according to some implementations. In some implementations, the system flow of the example environment 400 is performed on a device (e.g., device 10 of FIG. 1), such as a mobile device, desktop, laptop, or server device. The content of the example environment 400 can be displayed on a device (e.g., device 10 of FIG. 1) that has a screen (e.g., display 15) for displaying images and/or a screen for viewing stereoscopic images such as a head-mounted device (HMD). In some implementations, the system flow of the example environment 400 is performed on processing logic, including hardware, firmware, software, or a combination thereof. In some implementations, the system flow of the example environment 400 is performed on a processor executing code stored in a non-transitory computer-readable medium (e.g., a memory).

The system flow of the example environment 400 acquires image data and/or sound data from sensors of a physical environment (e.g., the physical environment 5 of FIG. 1), analyzes and classifies the environment image and/or sound data, selects an auditory stimulus based on a characteristic of an environment, presents the auditory stimulus to a user, obtains first physiological data associated with a physiological response of the user to the auditory stimulus, and assesses an attentive state of the user based on the physiological response of the user to the auditory stimulus. For example, an attentive state assessment technique described herein determines, based on obtained physiological data, a user's attentive state (e.g., attentive, mind-wandering, etc.) during an experience (e.g., a meditation experience) by providing an auditory stimulus that is based on the environment of the user (e.g., a bird chirp while meditating in the outdoors, a school bell while studying at a school, workplace noise while working such as a mail cart rolling by an office cubicle, and the like).

In an example implementation, the environment 400 includes an image and sound composition pipeline that acquires or obtains data (e.g., image data from image source(s) such as a camera on the device 402) of the physical environment. Example environment 400 is an example of acquiring image sensor data (e.g., light intensity data, depth data, and position information) for one or more image frames and sound data of the current environment. For example, a user acquires image data 404 and sound data 406 of a physical environment (e.g., the physical environment 5 of FIG. 1). The image source(s) may include a depth camera that acquires depth data of the physical environment, a light intensity camera (e.g., RGB camera) that acquires light intensity image data (e.g., a sequence of RGB image frames), and position sensors to acquire positioning information. The sound source(s) may include a microphone on the device 402 (e.g., device 10 of FIG. 1).

In some implementations, position sensors may be used to acquire positioning information which may be used to acquire additional information regarding the positioning of the device with respect to the environment during acquisition of the image data 402 and/or sound data 404. For the positioning information, some implementations include a visual inertial odometry (VIO) system to determine equivalent odometry information using sequential camera images (e.g., image data 404) to estimate the distance traveled. Alternatively, some implementations of the present disclosure may include a SLAM system (e.g., position sensors). The SLAM system may include a multidimensional (e.g., 3D) laser scanning and range measuring system that is GPS-independent and that provides real-time simultaneous location and mapping. The SLAM system may generate and manage data for a very accurate point cloud that results from reflections of laser scanning from objects in an environment. Movements of any of the points in the point cloud are accurately tracked over time, so that the SLAM system can maintain precise understanding of its location and orientation as it travels through an environment, using the points in the point cloud as reference points for the location. The SLAM system may further be a visual SLAM system that relies on light intensity image data to estimate the position and orientation of the camera and/or the device.

In an example implementation, the environment 400 includes an environment classifier instruction set 410 that is configured with instructions executable by a processor to generate classified environment data from image data and/or sound data of an environment. For example, the environment classifier instruction set 410 acquires image data 404 (e.g., a live camera feed such as RGB images from a light intensity camera) and/or sound data 406 from sensors on the device 402, and other sources of physical environment information (e.g., camera positioning information such as pose data from position sensors) of a physical environment (e.g., the physical environment 5 of FIG. 1), and determines a classification of the environment as classified environment data 414. The classified environment data 414 of the users' environment is determined using one of a plurality of class-specific neural networks: environment—class 1 neural network 412A, environment—class 2 neural network 412B, environment—class 3 neural network 412C, object—class N neural network 412N (generally referred to herein as environment—class neural networks 412). For example, a first network (e.g., environment—class 1 neural network 412A) is trained to analyze specific objects or features of an environment to determine a classification of that environment. For example, the environment—class neural networks 412 can detect trees, animals, etc. to determine that the current environment of the user is outside nature area. The environment—class neural networks 412 can detect cars, buildings, etc. to determine the current environment of the user is outside city area. The environment—class neural networks 412 can detect desks, books, students, etc. to determine the current environment of the user is inside a classroom. Each classification could further include subclasses. For example, a serene nature walk could be in a city park, or could be outside of a city in a more remote area. Each classification (or subclassification) could further enhance the auditory stimulus selection process to select an auditory stimulus that may be naturalistic event-related sensory stimuli that is largely unnoticeable in the sense that the stimuli may blend in with a user's natural scene and surroundings. In particular, a spatial location and timing of such stimuli can be controlled so that their statistics match the particular sensory environment a user may be experiencing. For example, a natural soundscape might be used during meditation in which bird sounds are distributed in space and time, but are able to produce sensory evoked neural responses while not appearing annoying or unnaturally salient.

In an example implementation, the environment 400 further includes an auditory stimulus instruction set 420 that is configured with instructions executable by a processor to select an auditory stimulus based on data of the environment. For example, the auditory stimulus instruction set 420 acquires classified environment data 414 of a physical environment (e.g., the physical environment 5 of FIG. 1) from the environment classifier instruction set 410 and determines and selects an auditory stimulus 422 from an auditory stimulus database 425 based on the classification of the environment. Alternatively, the auditory stimulus instruction set 420 selects an auditory stimulus 422 based on identified characteristic of the environment. For example, if a particular object was identified in the environment (e.g., a bird), then auditory stimulus instruction set 420 may then select a bird sound as the auditory stimulus 422. In particular, a spatial location and timing of such stimuli can be controlled so that their statistics match the particular sensory environment a user may be experiencing. For example, a natural soundscape might be used during meditation in which bird sounds are distributed in space and time, but are able to produce sensory evoked neural responses while not appearing annoying or unnaturally salient. Furthermore, using spatial audio, these particular events (e.g., auditory stimuli) can be varied spatially (e.g., along the azimuth) to evoke lateralized brain responses. In some implementations, a cognitive assessment technique using an auditory stimulus could be carried out for the entire duration of an experience without significantly interrupting the users attention or the user's ability to perform a task, but while yielding improved measures of the users attention to a task (e.g., focusing on breathing techniques during a meditation experience).

In an example implementation, the environment 400 further includes a content instruction set 430 that is configured with instructions executable by a processor to provide and/or track content for display on a device. For example, the content instruction set 430 acquires auditory stimulus 422 from the auditory stimulus instruction set 420 and provides content 432 to a user 25. For example, content 432 includes background image(s) and sound data 434. The content 432 could be an XR experience (e.g., meditation experience), or content 432 could be a MR experience that includes some XR content and some images of a physical environment. Alternatively, the user could be wearing a HMD and is looking at a real physical environment either via a live camera view, or the HMD allows a user to look through the display, such as wearing smart glasses that user can see through, but still be presented visual and/or audio cues. During an experience, while a user 25 is viewing and hearing the background image and sound data 434, pupillary data 435 (e.g., pupillary data 40 such as eye gaze characteristic data) of the user's eyes can be monitored and sent as physiological data 444. Additionally, or alternatively, a user 25 may be wearing a sensor 440 (e.g., an EEG sensor) that generates sensor data 442 (e.g. EEG data) as the physiological data. Thus, as the auditory stimulus 422 is presented to the user, the physiological data 444 (e.g., pupillary data 435) and/or sensor data 442 is sent to the physiological tracking instruction set 450 to track a user's physiological attributes as physiological tracking data 452 using one or more of the techniques discussed herein or as otherwise may be appropriate.

In an example implementation, the environment 400 further includes an attentive state instruction set 460 that is configured with instructions executable by a processor to assess the attentive state (e.g., attentive state such as mind wandering, meditation, etc.) of a user based on a physiological response (e.g., eye gaze response) using one or more of the techniques discussed herein or as otherwise may be appropriate. For example, the attentive state instruction set 460 acquires physiological tracking data 452 from the physiological tracking instruction set 450 and determines the attentive state (e.g., attentive state such as mind wandering, meditation, etc.) of the user 25 before, during, and/or after the presentation of the auditory stimulus 422. In some implementations, the attentive state instruction set 460 can then provide feedback data 464 to the content instruction set 430 based on the cognitive assessment. For example, finding defined markers of attention lapses and providing performance feedback during meditation could enhance a user experience, provide additional benefits from the meditation session, and provide a guided and supportive teaching approach (e.g., a scaffolding teaching method) for users to advance through their meditation practice.

In some implementations, the feedback data 464 could be utilized by the content state instruction set 430 to present an audio and/or visual feedback cue or mechanism to the user 25 to relax and focus on breathing during the mediation session. In an educational experience, the feedback cue to the user could be a gentle reminder (e.g., a soothing or calming visual and/or audio alarm) to get back on task of studying, based on the assessment from the attentive state instruction set 460 that the user 25 is mind wandering because the user 25 was distracted by the auditory stimulus 422. As discussed herein, the auditory stimulus 422 is intended to be selected as a naturalistic sound of the user's current environment such that the user shouldn't be distracted by the auditory stimulus 422 if the user was attentive at the task at hand. For example, the user in a mediation experience of a serene nature content by a lake, the user shouldn't be distracted by an auditory stimulus 422 that sounds like a bird chirping in the background. In another example, for a user that is determined to be at a workplace environment, the user shouldn't be distracted by an auditory stimulus 422 that sounds like someone walking by their office/cubicle, such as coworker pushing a mail cart by their workspace.

FIG. 5 is a flowchart illustrating an exemplary method 500. In some implementations, a device such as device 10 (FIG. 1) performs the techniques of method 500 to assess an attentive state of the user based on a physiological response to an auditory stimulus associated with a virtual location in a 3D coordinate system. The auditory stimulus may be presented during the presentation of content of an environment (e.g., visual and/or auditory electronic content that could be of the real-world physical environment, virtual content, or a combination of each). In some implementations, the techniques of method 500 are performed on a mobile device, desktop, laptop, HMD, or server device. In some implementations, the method 500 is performed on processing logic, including hardware, firmware, software, or a combination thereof. In some implementations, the method 500 is performed on a processor executing code stored in a non-transitory computer-readable medium (e.g., a memory).

At block 502, the method 500 presents an auditory stimulus during a presentation of an XR environment, where the auditory stimulus is associated with a virtual location in a 3D coordinate system. For example, the auditory stimulus may be a sound produced by manipulating the sound produced by stereo speakers, speaker arrays, or headphone speakers to virtually place the sound source in 3D space (e.g., to the user's left, right, behind, above, below, etc.). In some implementations, the sound may be a discrete sound (e.g., a bird chirp) at a single virtual location. Alternatively, the sound may be an audio segment that occurs over time and 3D coordinates associated with the virtual location remain stationary during the period of time. The auditory stimulus may be naturalistic event-related sensory stimuli that is largely unnoticeable in the sense that the stimuli may blend in with a users natural scene and surroundings. For example, an auditory stimulus (e.g., a bird chirp) may occur at the same 3D location with respect to the user. In particular, a spatial location and timing of such stimuli can be controlled so that their statistics match the particular sensory environment a user may be experiencing. For example, a natural soundscape might be used during meditation in which bird sounds are distributed in space and time, but are able to produce sensory evoked neural responses while not appearing annoying or unnaturally salient. Furthermore, using spatial audio, these particular events (e.g., an auditory stimuli) can be varied spatially (e.g., along the azimuth) to evoke lateralized brain responses. Alternatively, the sound may be an audio segment that occurs over time and 3D coordinates associated with the virtual location change during the period of time. For example, a sound may spatially change over time and appear to a user that the sound is getting closer (e.g., a bird flying toward you and the auditory stimulus is getting louder as it seems that is approaching the user).

In some implementations, the system may compile a library of sounds determined to evoke appropriate user responses for assessing attention and selection one of those sounds based on a user's environment. For example, the method 500 may further include determining, from an auditory stimuli database, one or more auditory stimuli that evoke a response for assessing attention of a user, and selecting an auditory stimulus from the one or more auditory stimuli during a presentation of an XR environment.

At block 504, the method 500 obtains, using a sensor, first physiological data (e.g., EEG amplitude/frequency, pupil modulation, eye gaze saccades, etc.) associated with a physiological response (or lack of response) of the user to the auditory stimulus. For example, obtaining the physiological data may involve monitoring for a response or lack of response occurring within a predetermined time following the presenting of the auditory stimulus.

In some implementations, obtaining the first physiological data associated with a physiological response of the user to the auditory stimulus includes determining that a possible response is consistent with the virtual location. For example, a sound to the user's left produces a response in which the user looks to the left.

In some implementations, obtaining the first physiological data associated with a physiological response of the user to the auditory stimulus includes monitoring for a response or lack of response occurring within a predetermined time following the presenting of the auditory stimulus. For example, the system may wait for up to five seconds to see if a spatialized bird chirps off in the horizon causes the user to look in that direction (e.g., a physiological response).

In some implementations, obtaining physiological data (e.g., pupillary data 40) is associated with a gaze of a user that may involve obtaining images of the eye or electrooculography signal (EOG) data from which gaze direction and/or movement can be determined.

At block 506, the method 500 assesses an attentive state of the user based on the physiological response of the user to the auditory stimulus. For example, the response may be compared with the user's own prior responses or typical user responses to similar auditory stimulus. In some implementations, attentive state may be determined using statistical or machine learning-based classification techniques. The determined attentive state could be used to provide feedback to the user, reorient the user, provide statistics to the user, and/or help content creators improve the content of the experience.

In some implementations, one or more pupillary or EEG characteristics may be determined, aggregated, and used to classify the user's attentive state using statistical or machine learning techniques. In some implementations, the physiological data is classified based on comparing the variability of the physiological data to a threshold. For example, if the baseline for a user's EEG data is determined during an initial segment of time (e.g., 30-60 seconds), and during a subsequent segment of time following the auditory stimulus (e.g., 5 seconds) the EEG data deviates more than +/−10% from the EEG baseline during the subsequent segment of time, than the techniques described herein could classify the user as transitioned away from the first attentive state (e.g., meditation) and entered a second attentive state (e.g., mind wandering).

In some implementations, a machine learning model may be used to classify the user's attentive state. For example, labeled training data for a user may be provided to the machine learning model. In some implementations, the machine learning model is a neural network (e.g., an artificial neural network), decision tree, support vector machine, Bayesian network, or the like. These labels may be collected from the user beforehand, or from a population of people beforehand, and fine-tuned later on individual users. Creating this labeled data may require many users going through an experience (e.g., meditation experience) where the users listen to natural sounds with intermixed natural-probes (e.g., auditory stimulus) and then randomly are asked how focused or relaxed they were shortly after a probe was presented. The answers to these questions can generate a label for the time prior to the question and a deep neural network or deep long short term memory (LSTM) network might learn a combination of features specific to that user or task given those labels.

In some implementations, use cases for assessing attentive states based on the physiological response of the user to an auditory stimulus may include meditation experiences, educational experiences, occupational experiences, and the like.

In some implementations, feedback can be provided to a user based on determining that the first attentive state (e.g., mind wandering) differs from an intended attentive state (e.g., focused attention) of the experience. In some implementations, the method 500 may further include presenting feedback (e.g., audio feedback such as "control your breathing", visual feedback, etc.) during the experience in response to determining that the first attentive state differs from a second attentive state intended for the experience. In one example, during a portion of a meditation experience in which a user is directed to focus on his or her breath, the method determines to present feedback reminding the user to focus on breathing based on detecting that the user is instead in a mind wandering attentive state.

In some implementations, content recommendation for a content developer can be provided based on determining attentive states during the presented experience and changes of the experience or content presented therein. For example, the user may focus well when particular types of content are provided. In some implementations, the method 500 may further include identifying content based on similarity of the content to the experience, and providing a recommendation of the content to the user based on determining that the user has the first attentive state during the experience (e.g., mind wandering).

In some implementations, content for the experience can be adjusted corresponding to the experience based on the attentive state differing from an intended attentive state for the experience. For example, content may be adjusted by an experience developer to improve recorded content for a subsequent use for the user or other users. In some implementations, the method 500 may further include adjusting content corresponding to the experience in response to determining that the first attentive state differs from a second attentive state intended for the experience.

In some implementations, an estimator or statistical learning method is used to better understand or make predictions about the physiological data (e.g., pupillary data characteristics, EEG data, etc.). For example, statistics for EEG data may be estimated by sampling a dataset with replacement data (e.g., a bootstrap method).

Figures 6A, 6B:
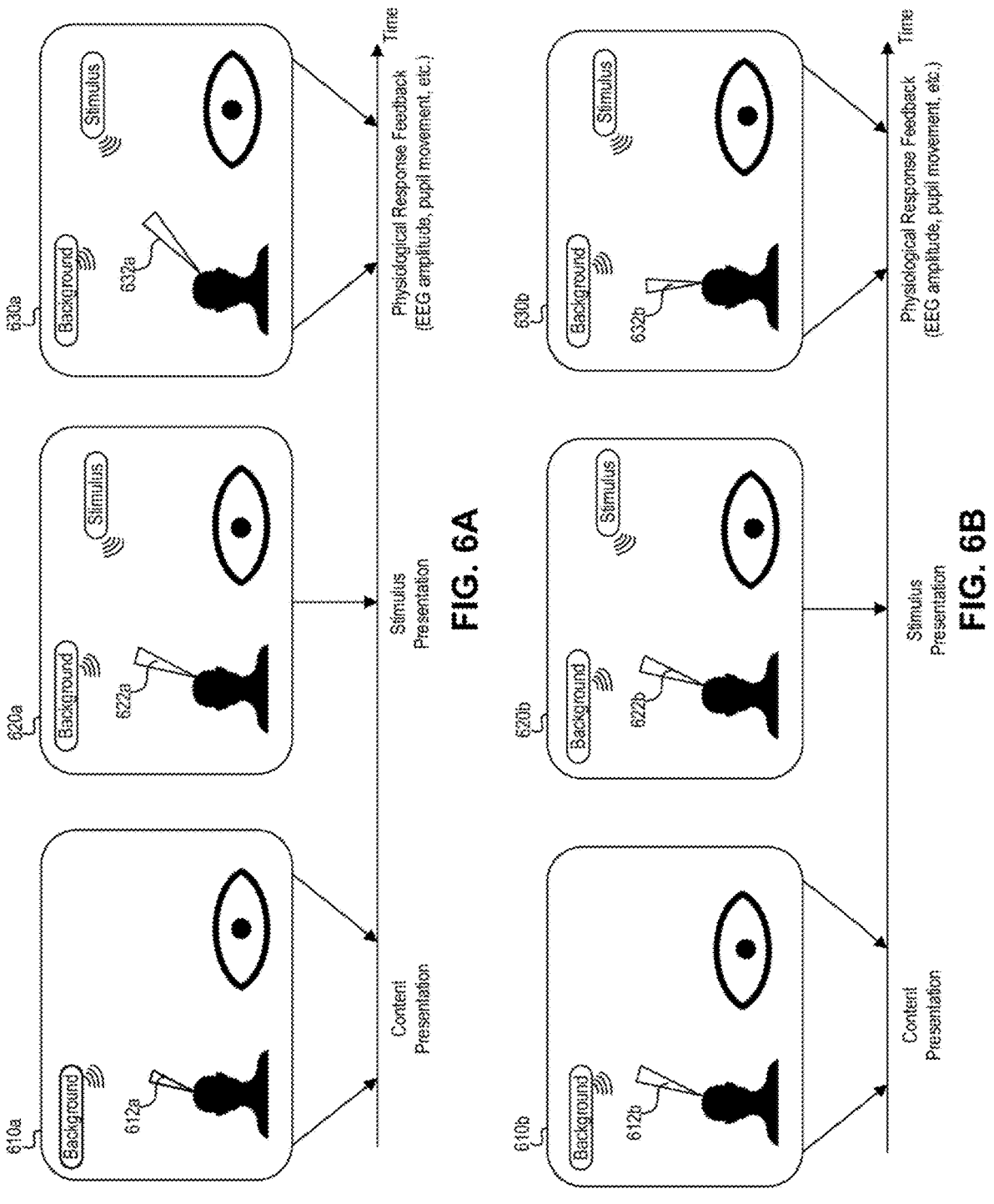
FIGS. 6A and 6B illustrate assessing an attentive state of the user based on a physiological response to an auditory stimulus associated with a virtual location in a 3D coordinate system.

FIGS. 6A and 6B illustrate assessing an attentive state of the user based on a physiological response to an auditory stimulus associated with a virtual location in a 3D coordinate system. FIG. 6A illustrates a user being presented with an auditory stimulus in a 3D location of the presented content during a content presentation where the user, via obtained physiological data, has a physiological response to the auditory stimulus (e.g., the user looks towards the 3D location of the spatialized sound). For example, a user (e.g., user 25) is being presented with content 610a that includes background sound and visual content (e.g., a nature scene for meditation), and the user's pupillary data 612a is monitored as a baseline. Then, content 620a is presented with an auditory stimulus, as the user's pupillary data 622a is being monitored for any physiological response (e.g., EEG amplitude/frequency, pupil modulation, eye gaze saccades, etc.). After a segment of time after the auditory stimulus has started (e.g., 0-5 seconds), content 630a is presented with the same auditory stimulus continuing, and the user's pupillary data 632a illustrates that the user eye gaze was drawn towards the 3D location of the auditory stimulus. Thus, the user had a physiological response to the auditory stimulus and therefore the attentive state assessment would be that the user is not attentive and may be mind wandering (e.g., is not focused on the task at hand, such as meditating). In some implementation, if the user is assessed as mind wandering, a feedback mechanism or cue could be presented with the presentation of the content to refocus the user to the task associated with the content.

FIG. 6B illustrates a user being presented with an auditory stimulus during a content presentation where the user, via obtained physiological data, does not have a physiological response to the stimulus. For example, a user (e.g., user 25) is being presented with content 610b that includes background sound and visual content (e.g., a nature scene for meditation), and the user's pupillary data 612b is monitored as a baseline. Then, content 620b is presented with an auditory stimulus, as the user's pupillary data 622b is being monitored for any physiological response (e.g., EEG amplitude/frequency, pupil modulation, eye gaze saccades, etc.). After a segment of time after the auditory stimulus has started (e.g., 0-5 seconds), content 630b is presented with the same auditory stimulus continuing, and the user's pupillary data 632b illustrates that the user eye gaze was not drawn towards the 3D location of the auditory stimulus. Thus, the user did not have a physiological response to the auditory stimulus and therefore the attentive state assessment would be that the user is attentive and not mind wandering (e.g., is focused on the task at hand, such as meditating).

In some implementations, the techniques could be trained on many sets of user physiological data and then adapted to each user individually. For example, content creators can customize a meditation experience based on the user physiological data, such as a user may require background music for meditation or require more or less audio or visual cues to continue to maintain meditation.

In some implementations, customization of the experience could be controlled by the user. For example, a user could select the meditation experience he or she desires, such as he or she can choose the ambience, background scene, music, etc. Additionally, the user could alter the threshold of providing the feedback mechanism in response to an auditory stimulus. For example, the user can customize the sensitivity of triggering the feedback mechanism based on prior experience of a session in response to an auditory stimulus. For example, a user may desire to not have as many feedback notifications and allow some mind wandering (e.g., eye position deviations) before a notification is triggered. Thus, particular experiences can be customized on triggering a threshold when higher criteria is met. For example, some experiences, such as an education experience, a user may not want to be bothered during a study session if he or she is briefly staring off task or mind wandering by briefly looking towards the auditory stimulus for a moment (e.g., less than 30 seconds) to contemplate what he or she just read. However, the student/reader would want to be given a notification if he or she is mind wandering for a longer period (e.g., longer than or equal to 30 seconds) by responding to an auditory stimulus.

In some implementations, the techniques described herein can account for real-world environment 5 of the user 25 (e.g., visual qualities such as luminance, contrast, semantic context) in its evaluation of how much to modulate or adjust the presented content or feedback mechanisms to enhance the physiological response (e.g., pupillary response) of the user 25 to the visual characteristic 30 (e.g., feedback mechanism).

In some implementations, the physiological data (e.g., pupillary data 40) may vary in time and the techniques described herein may use the physiological data to detect a pattern. In some implementations, the pattern is a change in physiological data from one time to another time, and, in some other implementations, the pattern is series of changes in physiological data over a period of time. Based on detecting the pattern, the techniques described herein can identify a change in the attentive state of the user (e.g., mind wandering) and can then provide a feedback mechanism (e.g., visual or auditory cue to focus on breathing) to the user 25 to return to an intended state (e.g., meditation) during an experience (e.g., meditation session). For example, an attentive state of a user 25 may be identified by detecting a pattern in a user's gaze characteristic, a visual or auditory cue associated with the experience may be adjusted (e.g., a feedback mechanism of a voice that states "focus on breathing" may further include a visual cue or a change in ambience of the scene), and the user's gaze characteristic compared to the adjusted experience can be used to confirm the attentive state of a user.

In some implementations, the techniques described herein can utilize a training or calibration sequence to adapt to the specific physiological characteristics of a particular user 25. In some implementations, the techniques present the user 25 with a training scenario in which the user 25 is instructed to interact with on-screen items (e.g., feedback objects). By providing the user 25 with a known intent or area of interest (e.g., via instructions), the techniques can record the user's physiological data (e.g., pupillary data 40) and identify a pattern associated with the user's gaze. In some implementations, the techniques can change a visual characteristic 30 (e.g., a feedback mechanism) associated with content 20 in order to further adapt to the unique physiological characteristics of the user 25. For example, the techniques can direct a user to mentally select a button associated with the auditory stimulus in the center of the screen on the count of three and record the user's physiological data (e.g., pupillary data 40) to identify a pattern associated with the user's attentive state. Moreover, the techniques can change or alter a visual characteristic associated with the auditory stimulus in order to identify a pattern associated with the user's physiological response to the altered visual characteristic. In some implementations, the pattern associated with the physiological response of the user 25 is stored in a user profile associated with the user and the user profile can be updated or recalibrated at any time in the future. For example, the user profile could automatically be modified overtime during a user experience to provide a more personalized user experience (e.g., a personal meditation experience).

In some implementations, a machine learning model (e.g., a trained neural network) is applied to identify patterns in physiological data, including identification of physiological responses to an auditory stimulus during presentation of content (e.g., content 20 of FIG. 1). Moreover, the machine learning model may be used to match the patterns with learned patterns corresponding to indications of interest or intent of the user 25 to interact with the auditory stimulus.

In some implementations, the techniques described herein may learn patterns specific to the particular user 25. For example, the techniques may learn from determining that a peak pattern represents an indication of interest or intent of the user 25 in response to a particular visual characteristic 30 within the content and use this information to subsequently identify a similar peak pattern as another indication of interest or intent of the user 25. Such learning can take into account the user's relative interactions with multiple visual characteristics 30, in order to further adjust the visual characteristic 30 and enhance the user's physiological response to the auditory stimulus and the presented content.

In some implementations, the location and features of the head 27 of the user 25 (e.g., an edge of the eye, a nose or a nostril) are extracted by the device 10 and used in finding coarse location coordinates of the eyes 45 of the user 25, thus simplifying the determination of precise eye 45 features (e.g., position, gaze direction, etc.) and making the gaze characteristic(s) measurement more reliable and robust. Furthermore, the device 10 may readily combine the 3D location of parts of the head 27 with gaze angle information obtained via eye part image analysis in order to identify a given on-screen object at which the user 25 is looking at any given time. In some implementations, the use of 3D mapping in conjunction with gaze tracking allows the user 25 to move his or her head 27 and eyes 45 freely while reducing or eliminating the need to actively track the head 27 using sensors or emitters on the head 27.

By tracking the eyes 45, some implementations reduce the need to re-calibrate the user 25 after the user 25 moves his or her head 27. In some implementations, the device 10 uses depth information to track the pupil's 50 movement, thereby enabling a reliable present pupil diameter 55 to be calculated based on a single calibration of user 25. Utilizing techniques such as pupil-center-corneal reflection (PCCR), pupil tracking, and pupil shape, the device 10 may calculate the pupil diameter 55, as well as a gaze angle of the eye 45 from a fixed point of the head 27, and use the location information of the head 27 in order to re-calculate the gaze angle and other gaze characteristic(s) measurements. In addition to reduced recalibrations, further benefits of tracking the head 27 may include reducing the number of light projecting sources and reducing the number of cameras used to track the eye 45.

In some implementations, the techniques described herein can identify a particular object within the content presented on the display 15 of the device 10 at a position in the direction of the user's gaze. Moreover, the techniques can change a state of the visual characteristic 30 associated with the particular object or the overall content experience responsively to a spoken verbal command received from the user 25 in combination with the identified attentive state of the user 25. For example, a particular object within the content may be an icon associated with a software application, and the user 25 may gaze at the icon, say the word "select" to choose the application, and a highlighting effect may be applied to the icon. The techniques can then use further physiological data (e.g., pupillary data 40) in response to the visual characteristic 30 (e.g., a feedback mechanism) to further identify an attentive state of the user 25 as a confirmation of the user's verbal command. In some implementations, the techniques can identify a given interactive item responsive to the direction of the user's gaze, and to manipulate the given interactive item responsively to physiological data (e.g., variability of the gaze characteristics). The techniques can then confirm the direction of the user's gaze based on further identifying attentive states of a user with physiological data in response to an auditory stimulus. In some implementations, the techniques can remove an interactive item or object based on the identified interest or intent. In other implementations, the techniques can automatically capture images of the content at times when an interest or intent of the user 25 is determined (e.g., in response to an auditory stimulus).

As a power saving feature, the techniques described herein can detect when the user 25 is not looking at the display and the techniques described herein can activate a power saving technique, e.g., disabling physiological sensors when the user 25 looks away for more than some threshold period of time. Furthermore, in some implementations, the techniques can dim or darken the display (e.g., decrease the brightness) entirely when the user 25 is not looking at the display. When the user 25 looks back toward the display, the techniques can deactivate the power saving techniques. In some implementations, the techniques can track a physiological attribute using a first sensor and then activate a second sensor to obtain the physiological data based on the tracking. For example, the techniques can use a camera (e.g., a camera on the device 10) to identify that the user 25 is looking in the direction of the device 10 and then activate an eye sensor when it is determined that the user 25 is looking in the direction of the device 10.

Figure 7:
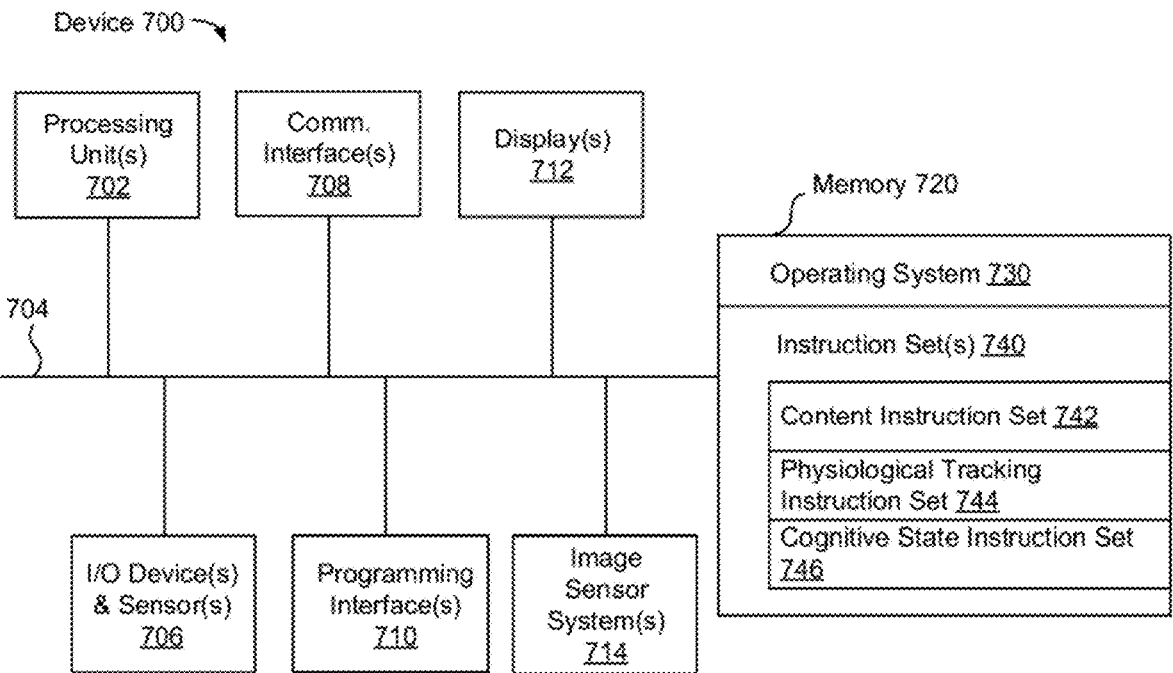
FIG. 7 illustrates device components of an exemplary device according to some implementations.

FIG. 7 is a block diagram of an example device 700. Device 700 illustrates an exemplary device configuration for device 10. While certain specific features are illustrated, those skilled in the art will appreciate from the present disclosure that various other features have not been illustrated for the sake of brevity, and so as not to obscure more pertinent aspects of the implementations disclosed herein. To that end, as a non-limiting example, in some implementations the device 10 includes one or more processors 702 (e.g., microprocessors, ASICs, FPGAs, CPUs, CPUs, processing cores, and/or the like), one or more input/output (I/O) devices and sensors 706, one or more communication interfaces 708 (e.g., USB, FIREWIRE, THUNDERBOLT, IEEE 802.3x, IEEE 802.11x, IEEE 802.16x, GSM, CDMA, TDMA, GPS, IR, BLUETOOTH, ZIGBEE, SPI, I2C, and/or the like type interface), one or more programming (e.g., I/O) interfaces 710, one or more displays 712, one or more sensor systems 714, a memory 720, and one or more communication buses 704 for interconnecting these and various other components.

In some implementations, the one or more communication buses 704 include circuitry that interconnects and controls communications between system components. In some implementations, the one or more I/O devices and sensors 706 include at least one of an inertial measurement unit (IMU), an accelerometer, a magnetometer, a gyroscope, a thermometer, one or more physiological sensors (e.g., blood pressure monitor, heart rate monitor, blood oxygen sensor, blood glucose sensor, etc.), one or more microphones, one or more speakers, a haptics engine, one or more depth sensors (e.g., a structured light, a time-of-flight, or the like), and/or the like.

In some implementations, the one or more displays 712 are configured to present a view of a physical environment or a graphical environment to the user. In some implementations, the one or more displays 712 correspond to holographic, digital light processing (DLP), liquid-crystal display (LCD), liquid-crystal on silicon (LCoS), organic light-emitting field-effect transitory (OLET), organic light-emitting diode (OLED), surface-conduction electron-emitter display (SED), field-emission display (FED), quantum-dot light-emitting diode (QD-LED), micro-electromechanical system (MEMS), and/or the like display types. In some implementations, the one or more displays 712 correspond to diffractive, reflective, polarized, holographic, etc. waveguide displays. In one example, the device 10 includes a single display. In another example, the device 10 includes a display for each eye of the user.

In some implementations, the one or more sensor systems 714 are configured to obtain sensor data that corresponds to at least a portion of the physical environment 5. For example, the one or more sensor systems 714 include one or more RGB cameras (e.g., with a complimentary metal-oxide-semiconductor (CMOS) image sensor or a charge-coupled device (CCD) image sensor), monochrome cameras, IR cameras, depth cameras, event-based cameras, and/or the like. In various implementations, the one or more sensor systems 714 further include illumination sources that emit light, such as a flash. In various implementations, the one or more sensor systems 714 further include an on-camera image signal processor (ISP) configured to execute a plurality of processing operations on the image data.

The memory 720 includes high-speed random-access memory, such as DRAM, SRAM, DDR RAM, or other random-access solid-state memory devices. In some implementations, the memory 720 includes non-volatile memory, such as one or more magnetic disk storage devices, optical disk storage devices, flash memory devices, or other non-volatile solid-state storage devices. The memory 720 optionally includes one or more storage devices remotely located from the one or more processors 702. The memory 720 includes a non-transitory computer readable storage medium.

In some implementations, the memory 720 or the non-transitory computer readable storage medium of the memory 720 stores an optional operating system 730 and one or more instruction set(s) 740. The operating system 730 includes procedures for handling various basic system services and for performing hardware dependent tasks. In some implementations, the instruction set(s) 740 include executable software defined by binary information stored in the form of electrical charge. In some implementations, the instruction set(s) 740 are software that is executable by the one or more processors 702 to carry out one or more of the techniques described herein.

The instruction set(s) 740 include a content instruction set 742, a physiological tracking instruction set 744, and an attentive state instruction set 746. The instruction set(s) 740 may be embodied a single software executable or multiple software executables.

In some implementations, the content instruction set 742 is executable by the processors 702 to provide and/or track content for display on a device. The content instruction set 742 may be configured to monitor and track the content overtime (e.g., during an experience such as a meditation session) and/or to identify change events that occur within the content. In some implementations, the content instruction set 742 may be configured to inject change events into content (e.g., feedback mechanisms) using one or more of the techniques discussed herein or as otherwise may be appropriate. To these ends, in various implementations, the instruction includes instructions and/or logic therefor, and heuristics and metadata therefor.

In some implementations, the physiological tracking instruction set 744 is executable by the processors 702 to track a user's physiological attributes (e.g., EEG amplitude/frequency, pupil modulation, eye gaze saccades, etc.) using one or more of the techniques discussed herein or as otherwise may be appropriate. To these ends, in various implementations, the instruction includes instructions and/or logic therefor, and heuristics and metadata therefor.

In some implementations, the attentive state instruction set 746 is executable by the processors 702 to assess the attentive state (e.g., mind wandering, attentive, meditation, etc.) of a user based on a physiological response (e.g., eye gaze response) using one or more of the techniques discussed herein or as otherwise may be appropriate. To these ends, in various implementations, the instruction includes instructions and/or logic therefor, and heuristics and metadata therefor.

Although the instruction set(s) 740 are shown as residing on a single device, it should be understood that in other implementations, any combination of the elements may be located in separate computing devices. Moreover, FIG. 7 is intended more as functional description of the various features which are present in a particular implementation as opposed to a structural schematic of the implementations described herein. As recognized by those of ordinary skill in the art, items shown separately could be combined and some items could be separated. The actual number of instructions sets and how features are allocated among them may vary from one implementation to another and may depend in part on the particular combination of hardware, software, and/or firmware chosen for a particular implementation.

Figure 8:
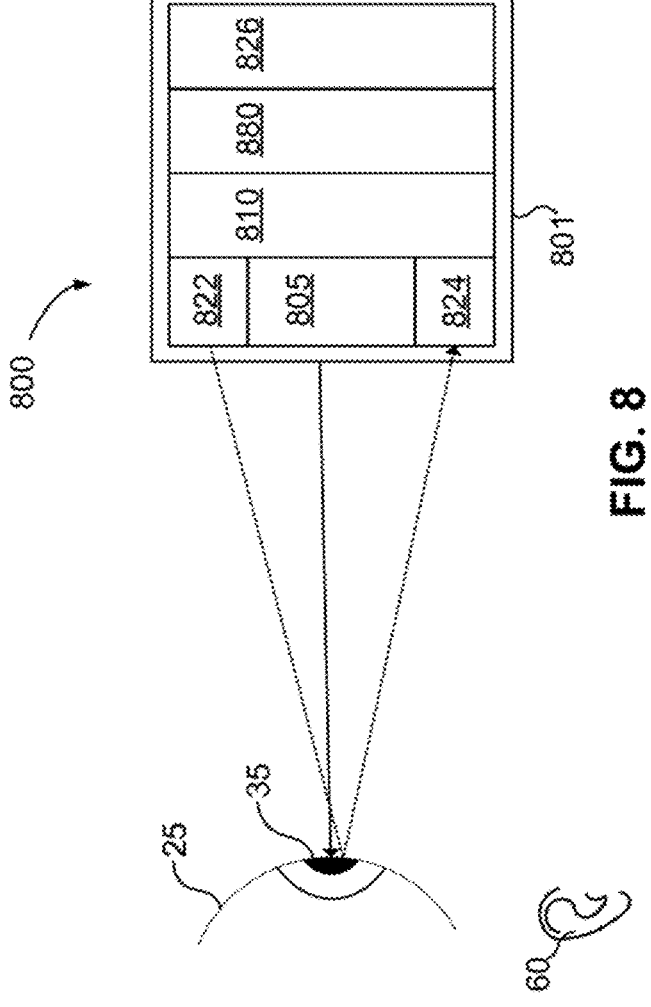
FIG. 8 illustrates an example head-mounted device (HMD) in accordance with some implementations.

FIG. 8 illustrates a block diagram of an exemplary head-mounted device 800 in accordance with some implementations. The head-mounted device 800 includes a housing 801 (or enclosure) that houses various components of the head-mounted device 800. The housing 801 includes (or is coupled to) an eye pad (not shown) disposed at a proximal (to the user 25) end of the housing 801. In various implementations, the eye pad is a plastic or rubber piece that comfortably and snugly keeps the head-mounted device 800 in the proper position on the face of the user 25 (e.g., surrounding the eye of the user 25).

The housing 801 houses a display 810 that displays an image, emitting light towards or onto the eye of a user 25. In various implementations, the display 810 emits the light through an eyepiece having one or more lenses 805 that refracts the light emitted by the display 810, making the display appear to the user 25 to be at a virtual distance farther than the actual distance from the eye to the display 810. For the user 25 to be able to focus on the display 810, in various implementations, the virtual distance is at least greater than a minimum focal distance of the eye (e.g., 8 cm). Further, in order to provide a better user experience, in various implementations, the virtual distance is greater than 1 meter.

The housing 801 also houses a tracking system including one or more light sources 822, camera 824, and a controller 880. The one or more light sources 822 emit light onto the eye of the user 25 that reflects as a light pattern (e.g., a circle of glints) that can be detected by the camera 824. Based on the light pattern, the controller 880 can determine an eye tracking characteristic of the user 25. For example, the controller 880 can determine a gaze direction and/or a blinking state (eyes open or eyes closed) of the user 25. As another example, the controller 880 can determine a pupil center, a pupil size, or a point of regard. Thus, in various implementations, the light is emitted by the one or more light sources 822, reflects off the eye of the user 25, and is detected by the camera 824. In various implementations, the light from the eye of the user 25 is reflected off a hot mirror or passed through an eyepiece before reaching the camera 824.

The housing 801 also houses an audio system that includes one or more audio source(s) 826 that the controller can utilize for providing audio to the user ears 60 via sound waves 14 per the techniques described herein. For example, audio source(s) 826 can provide sound for both background sound and the auditory stimulus that can be presented spatially in a 3D coordinate system. The audio source(s) 826 can include a speaker, a connection to an external speaker system such as headphones, or an external speaker connected via a wireless connection.

The display 810 emits light in a first wavelength range and the one or more light sources 822 emit light in a second wavelength range. Similarly, the camera 824 detects light in the second wavelength range. In various implementations, the first wavelength range is a visible wavelength range (e.g., a wavelength range within the visible spectrum of approximately 400-700 nm) and the second wavelength range is a near-infrared wavelength range (e.g., a wavelength range within the near-infrared spectrum of approximately 700-1400 nm).

In various implementations, eye tracking (or, in particular, a determined gaze direction) is used to enable user interaction (e.g., the user 25 selects an option on the display 810 by looking at it), provide foveated rendering (e.g., present a higher resolution in an area of the display 810 the user 25 is looking at and a lower resolution elsewhere on the display 810), or correct distortions (e.g., for images to be provided on the display 810).

In various implementations, the one or more light sources 822 emit light towards the eye of the user 25 which reflects in the form of a plurality of glints.

In various implementations, the camera 824 is a frame/shutter-based camera that, at a particular point in time or multiple points in time at a frame rate, generates an image of the eye of the user 25. Each image includes a matrix of pixel values corresponding to pixels of the image which correspond to locations of a matrix of light sensors of the camera. In implementations, each image is used to measure or track pupil dilation by measuring a change of the pixel intensities associated with one or both of a user's pupils.

In various implementations, the camera 824 is an event camera including a plurality of light sensors (e.g., a matrix of light sensors) at a plurality of respective locations that, in response to a particular light sensor detecting a change in intensity of light, generates an event message indicating a particular location of the particular light sensor.

It will be appreciated that the implementations described above are cited by way of example, and that the present invention is not limited to what has been particularly shown and described hereinabove. Rather, the scope includes both combinations and sub combinations of the various features described hereinabove, as well as variations and modifications thereof which would occur to persons skilled in the art upon reading the foregoing description and which are not disclosed in the prior art.

As described above, one aspect of the present technology is the gathering and use of physiological data to improve a user's experience of an electronic device with respect to interacting with electronic content. In some instances, this gathered data may include personal information. For example, such information may include data that uniquely identifies a specific person or can be used to identify interests, characteristics, or behaviors of an individual. Such information data can include physiological data, demographic data, location data, device characteristics of personal devices, or any other personal information. Such information can be used to the benefit of users. For example, personal information data be used to improve interaction and control capabilities of an electronic device. Any personal information and/or physiological data should be used in accordance with well-established privacy policies and/or privacy practices. Such policies and practices should meet or exceed industry or governmental information privacy and data requirements. The collection of such information should be based on user consent and should only be for legitimate and reasonable uses. Moreover, collected personal information should not be used or shared outside of those legitimate uses and reasonable steps should be taken to safeguard and secure access to the information.

In some implementations, users selectively block access to and/or use of personal information. Hardware or software elements can be provided to prevent or block access to such personal information. For example, a system can be configured to enable users to "opt in" or "opt out" of the collection of personal information. In another example, users can select not to provide personal information for particular purposes such as targeted content delivery.

While the present disclosure broadly covers use of personal information, the various implementations can also be implemented without the need for accessing such personal information. Various implementations are not rendered inoperable due to the lack of all or a portion of such personal information. For example, content can be selected and delivered to users by inferring preferences or settings based on non-personal information data or a bare minimum amount of personal information, such as the content being requested by the device associated with a user, other non-personal information available to the content delivery services, or publicly available information.

In some implementations, data is stored in a way that only allows the owner of the data to access the data. For example, data such as personal information may be encrypted using a public/private key system. In some other implementations, the data may be stored anonymously (e.g., without identifying personal information about the user, such as a legal name, username, time and location data, or the like). This may prevent others from being able to determine the identity of the user associated with the stored data.

Numerous specific details are set forth herein to provide a thorough understanding of the claimed subject matter. However, those skilled in the art will understand that the claimed subject matter may be practiced without these specific details. In other instances, methods, apparatuses, or systems that would be known by one of ordinary skill have not been described in detail so as not to obscure claimed subject matter.

Unless specifically stated otherwise, it is appreciated that throughout this specification discussions utilizing the terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provides a result conditioned on one or more inputs. Suitable computing devices include multipurpose microprocessor-based computer systems accessing stored software that programs or configures the computing system from a general purpose computing apparatus to a specialized computing apparatus implementing one or more implementations of the present subject matter. Any suitable programming, scripting, or other type of language or combinations of languages may be used to implement the teachings contained herein in software to be used in programming or configuring a computing device.

Implementations of the methods disclosed herein may be performed in the operation of such computing devices. The order of the blocks presented in the examples above can be varied for example, blocks can be re-ordered, combined, or broken into sub-blocks. Certain blocks or processes can be performed in parallel.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or value beyond those recited. Headings, lists, and numbering included herein are for ease of explanation only and are not meant to be limiting.

It will also be understood that, although the terms "first," "second," etc. may be used herein to describe various objects, these objects should not be limited by these terms. These terms are only used to distinguish one object from another. For example, a first node could be termed a second node, and, similarly, a second node could be termed a first node, which changing the meaning of the description, so long as all occurrences of the "first node" are renamed consistently and all occurrences of the "second node" are renamed consistently. The first node and the second node are both nodes, but they are not the same node.

The terminology used herein is for the purpose of describing particular implementations only and is not intended to be limiting of the claims. As used in the description of the implementations and the appended claims, the singular forms "a," "an," and "the" are intended to include the plural forms as well, unless the context clearly indicates otherwise. It will also be understood that the term "or" as used herein refers to and encompasses any and all possible combinations of one or more of the associated listed items. It will be further understood that the terms "comprises" or "comprising," when used in this specification, specify the presence of stated features, integers, steps, operations, objects, or components, but do not preclude the presence or addition of one or more other features, integers, steps, operations, objects, components, or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

The foregoing description and summary of the invention are to be understood as being in every respect illustrative and exemplary, but not restrictive, and the scope of the invention disclosed herein is not to be determined only from the detailed description of illustrative implementations but according to the full breadth permitted by patent laws. It is to be understood that the implementations shown and described herein are only illustrative of the principles of the present invention and that various modification may be implemented by those skilled in the art without departing from the scope and spirit of the invention.

What is claimed is:

1. A method of attentive state assessment, the method comprising:

at a device comprising a processor and a speaker:

determining a type of an environment of a user based on sensor data;

selecting an auditory stimulus based on selecting a sound from a plurality of sounds corresponding to the determined type of the environment, the auditory stimulus being selected to evoke a physiological response for assessing an attentive state of the user and is associated with a location in a three-dimensional (3D) coordinate system corresponding to the environment;

presenting the auditory stimulus to the user via the speaker at the location in the 3D coordinate system;

obtaining, using a sensor, first physiological data associated with a physiological response of the user to the auditory stimulus; and assessing the attentive state of the user based on the physiological response of the user to the auditory stimulus.

2. The method of claim 1, wherein selecting the auditory stimulus comprises:

classifying one or more objects in the environment; and selecting the auditory stimulus based on the classified one or more objects.

3. The method of claim 1, wherein selecting the auditory stimulus comprises:

determining, from an auditory stimuli database, one or more auditory stimuli that evoke a response for assessing attention of a user; and selecting the auditory stimulus from the one or more auditory stimuli based on the environment.

4. The method of claim 1, wherein the environment is a physical environment around the user.

5. The method of claim 1, wherein the environment is an extended reality (XR) experience that is presented to the user.

6. The method of claim 1, wherein the auditory stimulus is a discrete sound, a series of sounds, or a spatialized sound.

7. The method of claim 1, wherein obtaining the first physiological data associated with a physiological response of the user to the auditory stimulus comprises monitoring for a response or lack of response occurring within a predetermined time following the presenting of the auditory stimulus.

8. The method of claim 1, wherein the first physiological data comprises electroencephalogram (EEG) amplitude data that is associated with the user.

9. The method of claim 1, wherein the first physiological data comprises pupillary movement that is associated with the user.

10. The method of claim 1, wherein the attentive state is assessed using a statistical or machine learning-based classification technique.

11. The method of claim 1, further comprising providing a notification to the user based on the attentive state.

12. The method of claim 1, further comprising identifying a portion of content associated with presenting the auditory stimulus to the user.

13. The method of claim 1, further comprising customizing content to be presented to the user based on the attentive state of the user.

14. The method of claim 1, further comprising aggregating attentive states determined for multiple users viewing content to provide feedback regarding the content.

15. The method of claim 1, wherein the device is a head-mounted device (HMD) and the environment comprises an extended reality (XR) environment.

16. The method of claim 1, wherein the auditory stimulus being selected to evoke the physiological response for assessing the attentive state of the user is based on distinguishing between an intended focused attention state and a mind wandering state.

17. The method of claim 1, wherein the auditory stimulus is associated with a location in a three-dimensional (3D) coordinate system corresponding to the environment, and wherein the auditory stimulus is presented to a user at the location in the 3D coordinate system.

18. The method of claim 1, wherein the auditory stimulus is associated with a virtual location in a three-dimensional (3D) coordinate system.

19. A device comprising:

a speaker;

a non-transitory computer-readable storage medium; and one or more processors coupled to the non-transitory computer-readable storage medium, wherein the non-transitory computer-readable storage medium comprises program instructions that, when executed on the one or more processors, cause the one or more processors to perform operations comprising:

determining a type of an environment of a user based on sensor data;

selecting an auditory stimulus based on selecting a sound from a plurality of sounds corresponding to the determined type of the environment, the auditory stimulus being selected to evoke a physiological response for assessing an attentive state of the user and is associated with a location in a three-dimensional (3D) coordinate system corresponding to the environment;

presenting the auditory stimulus to the user via the speaker at the location in the 3D coordinate system;

obtaining, using a sensor, first physiological data associated with a physiological response of the user to the auditory stimulus; and assessing the attentive state of the user based on the physiological response of the user to the auditory stimulus.

20. A non-transitory computer-readable storage medium, storing program instructions executable on a device to perform operations comprising:

determining a type of an environment of a user based on sensor data;

selecting an auditory stimulus based on a selecting a sound from a plurality of sounds corresponding to the determined type of the environment, the auditory stimulus being selected to evoke a physiological response for assessing an attentive state of the user and is associated with a location in a three-dimensional (3D) coordinate system corresponding to the environment;

presenting the auditory stimulus to the user via a speaker at the location in the 3D coordinate system;

obtaining, using a sensor, first physiological data associated with a physiological response of the user to the auditory stimulus; and assessing the attentive state of the user based on the physiological response of the user to the auditory stimulus.

21. The method of claim 1, wherein selecting the auditory stimulus comprises:

classifying the environment into an environment type; and selecting the auditory stimulus based on the environment type.

\* \* \* \* \*